(12) United States Patent
Ono

(10) Patent No.: US 11,122,242 B2
(45) Date of Patent: Sep. 14, 2021

(54) IMAGING DEVICE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/207,715

(22) Filed: Mar. 21, 2021

(65) Prior Publication Data
US 2021/0211617 A1 Jul. 8, 2021

Related U.S. Application Data

(63) Continuation of application No. PCT/JP2019/038019, filed on Sep. 26, 2019.

(30) Foreign Application Priority Data

Oct. 9, 2018 (JP) .............................. JP2018-190963

(51) Int. Cl.
*H04N 5/235* (2006.01)
*H04N 9/04* (2006.01)
(Continued)

(52) U.S. Cl.
CPC ....... *H04N 9/04557* (2018.08); *G02B 27/281* (2013.01); *H04N 5/341* (2013.01); *H04N 5/378* (2013.01)

(58) Field of Classification Search
CPC .... H04N 9/04557; H04N 5/341; H04N 5/378; G02B 27/281
(Continued)

(56) References Cited

U.S. PATENT DOCUMENTS

2009/0179143 A1   7/2009   Murooka et al.
2013/0083172 A1   4/2013   Baba
(Continued)

FOREIGN PATENT DOCUMENTS

JP   2009169096   7/2009
JP   2012027393   2/2012
(Continued)

OTHER PUBLICATIONS

"International Search Report (Form PCT/ISA/210) of PCT/JP2019/038019," dated Dec. 17, 2019, with English translation thereof, pp. 1-4.
(Continued)

*Primary Examiner* — William Choi
(74) *Attorney, Agent, or Firm* — JCIPRNET

(57) ABSTRACT

Provided is an imaging device that can acquire a high-quality multispectral image with one image sensor. An imaging device includes: an image sensor (100) including a plurality of pixel blocks each of which includes n (n≥2) types of spectral filter elements having different spectral transmittances and m (2≤m≤3) types of polarization filter elements having different transmission polarization directions which are combined such that q (q=n×m) types of light are received by each pixel; an optical system (10) that includes k (k≤q) optical regions transmitting light in different wavelength bands and polarization filter units provided in each of the optical regions; and a signal processing unit (200) that processes a signal (pixel signal) of each pixel obtained from the image sensor (100) to generate an image of each optical region of the optical system (10). The signal processing unit (200) performs predetermined arithmetic processing on q pixel signals (x1, x2, . . . , Xq) obtained from each pixel block of the image sensor (100) to calculate k pixel signals (X1, X2, . . . , Xk) corresponding to each of the optical regions of the optical system (100) and generates an image of each optical region.

12 Claims, 17 Drawing Sheets

(51) Int. Cl.
   *H04N 5/378*   (2011.01)
   *H04N 5/341*   (2011.01)
   *G02B 27/28*   (2006.01)

(58) Field of Classification Search
   USPC ..................................... 348/222.1, 294, 302
   See application file for complete search history.

(56) References Cited

U.S. PATENT DOCUMENTS

| | | |
|---|---|---|
| 2014/0168490 A1 | 6/2014 | Imamura |
| 2015/0192758 A1 | 7/2015 | Yamagata et al. |
| 2020/0195862 A1* | 6/2020 | Briggs ................. G06K 9/2018 |

FOREIGN PATENT DOCUMENTS

| | | |
|---|---|---|
| JP | 2013077935 | 4/2013 |
| JP | 2015211430 | 11/2015 |
| WO | 2012143983 | 10/2012 |
| WO | 2015004886 | 1/2015 |

OTHER PUBLICATIONS

"Written Opinion of the International Searching Authority (Form PCT/ISA/237) of PCT/JP2019/038019," dated Dec. 17, 2019, with English translation thereof, pp. 1-6.

* cited by examiner

IMAGING DEVICE

CROSS-REFERENCE TO RELATED APPLICATIONS

The present application is a Continuation of PCT International Application No. PCT/JP2019/038019 filed on Sep. 26, 2019 claiming priority under 35 U.S.C § 119(a) to Japanese Patent Application No. 2018-190963 filed on Oct. 9, 2018. Each of the above applications is hereby expressly incorporated by reference, in its entirety, into the present application.

BACKGROUND OF THE INVENTION

1. Field of the Invention

The present invention relates to an imaging device, and more particularly, to an imaging device that acquires images (multispectral image) of a plurality of wavelength bands.

2. Description of the Related Art

As an imaging device that acquires images (multispectral image) of a plurality of wavelength bands, WO2012/143983A discloses an imaging device having a configuration in which a pupil portion of an optical system is divided, optical filters having different spectral transmittances are disposed in each of the divided pupil portions, and a microlens array is disposed in front of the image sensor. The imaging device acquires a multispectral image with one image sensor by guiding light from different optical regions of the pupil portion to different pixels using the beam separation effect of the microlens array.

However, the separation of beams by the microlens array is not always perfect. Therefore, the imaging device disclosed in WO2012/143983A has a problem that light leaks to adjacent pixels and crosstalk occurs.

In order to solve this problem, WO2015/004886A proposes a technique that performs predetermined signal processing on a signal (pixel signal) obtained from each pixel to remove the influence of crosstalk.

SUMMARY OF THE INVENTION

However, the amount of crosstalk occurring in each pixel in a case in which beams are separated by the microlens array varies depending on the position of the pixels. Therefore, in the imaging device disclosed in WO2015/004886A, it is necessary to calculate the amount of crosstalk occurring in each pixel in order to obtain a higher-quality image. However, this requires a great deal of effort.

The invention has been made in view of the above-mentioned problems, and an object of the invention is to provide an imaging device that can acquire a high-quality multispectral image with one image sensor.

The means for solving the above-mentioned problems are as follows.

(1) There is provided an imaging device comprising: an image sensor including a plurality of pixel blocks, each of which includes n types of first optical filter elements having different spectral transmittances and m types of second optical filter elements having different transmission polarization directions which are combined such that q types of light are received by each pixel, where n is an integer satisfying n≥2, m is an integer satisfying 2≤m≤3, and q is a product of n and m; an optical system that includes k optical regions transmitting light in different wavelength bands and polarization filter units provided in each of the optical regions, where k is an integer satisfying k≤q; a storage unit that stores a coefficient group configured by a matrix A of k rows and q columns in which each element is represented by aij, where i is an integer satisfying 1≤i≤k and j is an integer satisfying 1≤j≤q; and an arithmetic unit that acquires the coefficient group from the storage unit and calculates k pixel signals X1, X2, ..., Xk corresponding to each of the optical regions of the optical system from q pixel signals x1, x2, ..., Xq obtained from each of the pixel blocks of the image sensor using the following expression.

$$\begin{bmatrix} X1 \\ X2 \\ \vdots \\ Xk \end{bmatrix} = \begin{bmatrix} a11 & a12 & \ldots & a1q \\ a21 & a22 & \ldots & a2q \\ \vdots & \vdots & \vdots & \vdots \\ ak1 & ak2 & \ldots & akq \end{bmatrix} * \begin{bmatrix} x1 \\ x2 \\ \vdots \\ xq \end{bmatrix}$$

According to this aspect, predetermined arithmetic processing is performed on the signal obtained from each pixel of the image sensor for each pixel block to obtain a signal corresponding to each optical region of the optical system. That is, a signal without crosstalk is obtained. Therefore, it is possible to acquire a high-quality multispectral image.

(2) In the imaging device according to (1), the matrix A may be acquired by calculating an inverse matrix of a matrix that has, as an element, a ratio at which light incident on each of the optical regions of the optical system is received by each of the pixels of each of the pixel blocks of the image sensor.

According to this aspect, an inverse matrix $B^{-1}$ of a matrix B having, as an element, the ratio at which the light incident on each optical region of the optical system is received by each pixel of each pixel block of the image sensor is calculated to calculate the matrix A of the above-mentioned arithmetic expression.

(3) In the imaging device according to (2), in a case in which a transmittance based on polarization is c and a transmittance based on spectral transmittance is d, the ratio at which the light incident on each of the optical regions of the optical system is received by each of the pixels of each of the pixel blocks of the image sensor may be calculated by a product of c and d.

According to this aspect, each element of the matrix B is calculated by the product of the transmittance c based on polarization and the transmittance d based on spectral transmittance.

(4) In the imaging device according to (3), the transmittance c based on polarization may be obtained by calculating a square of a cosine of an angular difference between the transmission polarization direction of the light transmitted through the optical region and the transmission polarization direction of the light received by the pixel, and the transmittance d based on spectral transmittance may be calculated on the basis of the wavelength band of the light transmitted through the optical region and the spectral transmittance of the first optical filter element included in the pixel.

According to this aspect, the transmittance c based on polarization is calculated by the square of the cosine of the angular difference between the transmission polarization direction of the light transmitted through the optical region and the transmission polarization direction of the light received by the pixel. Further, the transmittance d based on spectral transmittance is calculated on the basis of the wavelength band of the light transmitted through the optical region and the spectral transmittance of the first optical filter element included in the pixel.

(5) In the imaging device according to any one of (1) to (4), in the optical system, the number of the polarization filter units having the same transmission polarization direction may be equal to or less than n.

According to this aspect, in the optical system, the number of the polarization filter units having the same transmission polarization direction is equal to or less than the number of types of the first optical filter elements included in the image sensor.

(6) In the imaging device according to any one of (1) to (5), each of the pixel blocks of the image sensor may have a configuration in which three types of the first optical filter elements having different spectral transmittances and three types of the second optical filter elements having different transmission polarization directions are combined such that nine types of light are received by each of the pixels.

According to this aspect, each pixel block of the image sensor has the configuration in which three types of first optical filter elements having different spectral transmittances and three types of second optical filter elements having different transmission polarization directions are combined such that nine types of light are received by each pixel.

(7) In the imaging device according to (6), the optical system may include nine optical regions that transmit light in different wavelength bands.

According to this aspect, the optical system includes the nine optical regions that transmit light in different wavelength bands.

(8) In the imaging device according to (7), in the optical system, each set of three optical regions may include the polarization filter unit having the same transmission polarization direction.

According to this aspect, in the optical system, each set of three optical regions includes the polarization filter unit having the same transmission polarization direction.

(9) In the imaging device according to (8), a combination of the transmission polarization directions of the polarization filter units included in the optical system may be the same as a combination of the transmission polarization directions of the second optical filter elements included in the image sensor.

According to this aspect, the combination of the transmission polarization directions of the polarization filter units included in the optical system is the same as the combination of the transmission polarization directions of the second optical filter elements included in the image sensor. For example, in a case in which the transmission polarization directions of the polarization filter units comprised in the optical system are 0°, 60°, and 90°, the transmission polarization directions of the second optical filter elements comprised in the image sensor are 0°, 60°, and 90°.

(10) In the imaging device according to any one of (1) to (9), the optical system may include narrow-band filters having different transmission wavelengths which are provided in each of the optical regions.

According to this aspect, in the optical system, the narrow-band filters having different transmission wavelengths are provided in each of the optical regions.

(11) In the imaging device according to (10), in the optical system, the narrow-band filter may be provided at a pupil position.

According to this aspect, in the optical system, the narrow-band filter is provided at the pupil position.

(12) In the imaging device according to any one of (1) to (11), in the image sensor, the first optical filter element and the second optical filter element may be provided between a photodiode and a microlens which constitute each of the pixels.

According to this aspect, the image sensor has the configuration in which the first optical filter element and the second optical filter element are provided between the photodiode and the microlens constituting each pixel.

According to the invention, it is possible to acquire a high-quality multispectral image with one image sensor.

DESCRIPTION OF THE PREFERRED EMBODIMENTS

Hereinafter, preferred embodiments of the invention will be described in detail with reference to the accompanying drawings.

[Configuration of Device]

Here, a case in which images (multispectral image) of nine wavelength bands are acquired will be described as an example.

Figure 1:
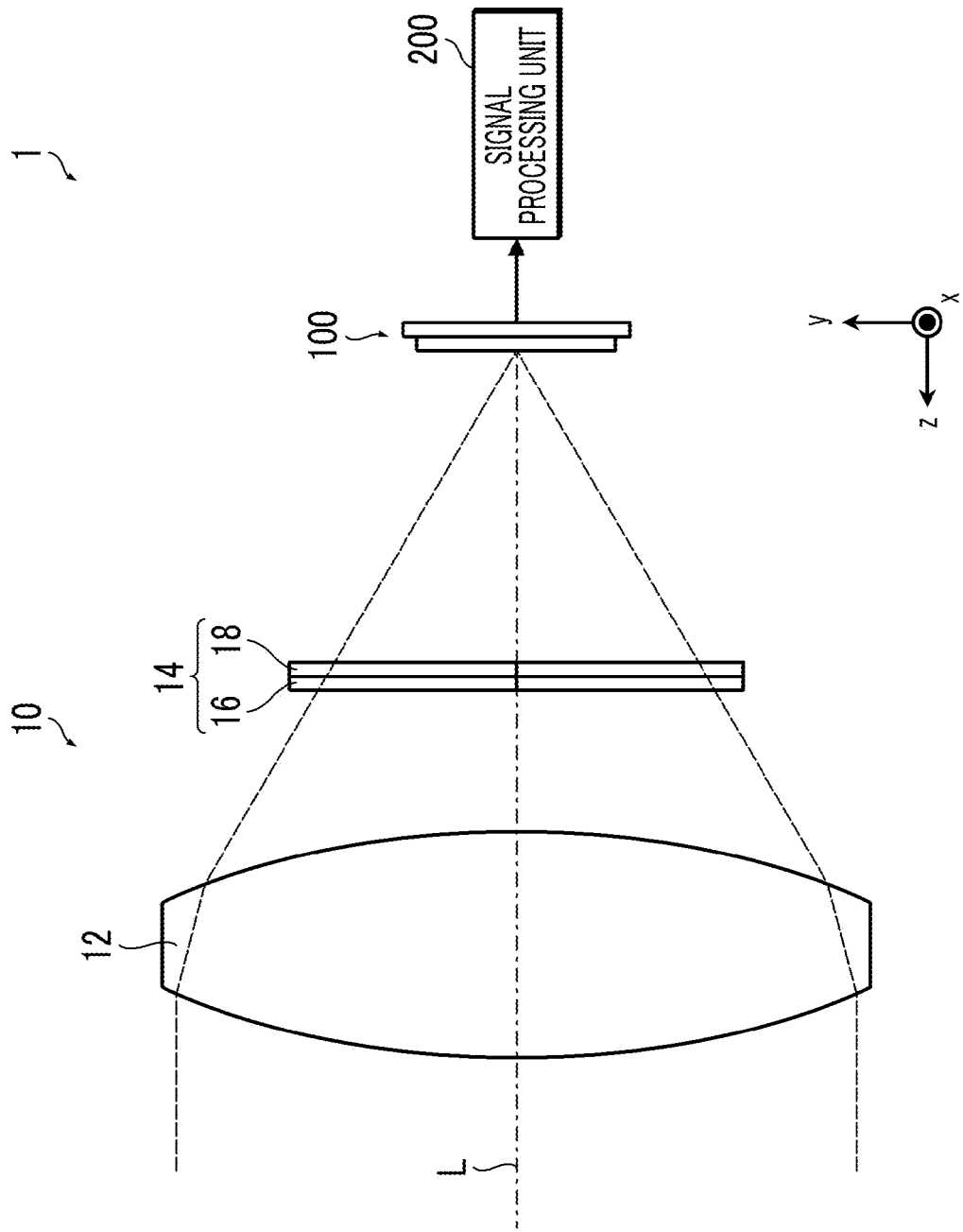
FIG. 1 is a diagram illustrating a schematic configuration of an embodiment of an imaging device according to the invention.

FIG. 1 is a diagram illustrating a schematic configuration of an embodiment of an imaging device according to the invention.

As illustrated in FIG. 1, an imaging device 1 comprises an optical system 10, an image sensor 100, and a signal processing unit 200.

[Optical System]

The optical system 10 comprises a lens 12 and a pupil division filter 14.

The lens 12 forms an optical image of an object on a light receiving surface of the image sensor 100. The lens 12 has a configuration corresponding to the purpose of the imaging device 1.

The pupil division filter 14 is provided at or near the pupil position of the optical system 10 and divides a pupil portion of the optical system 10 into nine optical regions. The pupil division filter 14 is configured by superimposing a spectral filter 16 and a polarization filter 18.

Figure 2:
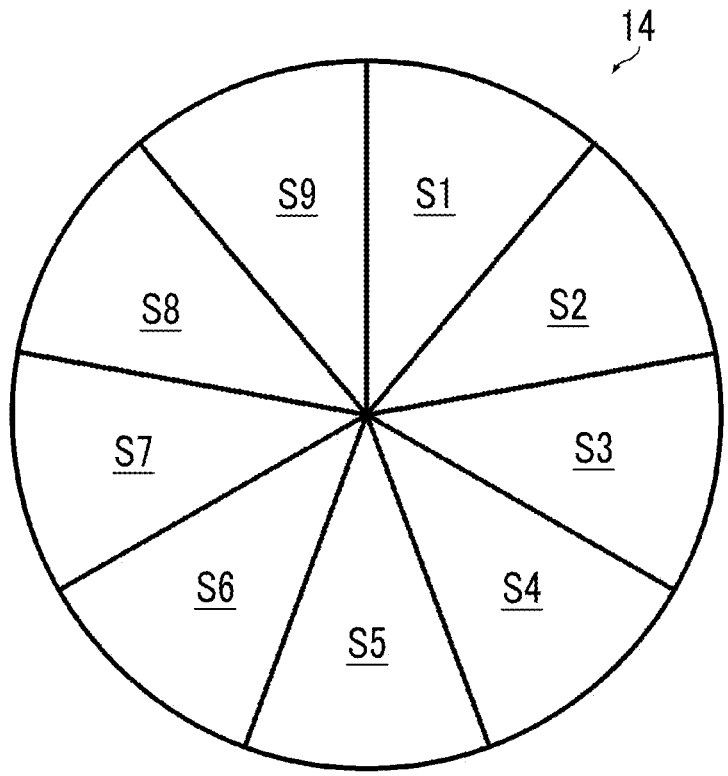
FIG. 2 is a front view illustrating a pupil division filter.

FIG. 2 is a front view illustrating the pupil division filter.

As illustrated in FIG. 2, the pupil division filter 14 has nine optical regions Sj (j=1, 2, 3, 4, 5, 6, 7, 8, 9) which are nine equal parts divided in a circumferential direction. Hereinafter, as needed, the nine optical regions Sj are distinguished by defining the optical region represented by reference numeral S1 as a first optical region S1, the optical region represented by reference numeral S2 as a second optical region S2, the optical region represented by reference numeral S3 as a third optical region S3, the optical region represented by reference numeral S4 as a fourth optical region S4, the optical region represented by reference numeral S5 as a fifth optical region S5, the optical region represented by reference numeral S6 as a sixth optical region S6, the optical region represented by reference numeral S7 as a seventh optical region S7, the optical region represented by reference numeral S8 as an eighth optical region S8, and the optical region represented by reference numeral S9 as a ninth optical region S9.

The optical regions Sj are set to transmit light in different wavelength bands. Further, among the nine optical regions Sj, an optical region group composed of the first optical region S1, the second optical region S2, and the third optical region S3, an optical region group composed of the fourth optical region S4, the fifth optical region S5, and the sixth optical region S6, and an optical region group composed of the seventh optical region S7, the eighth optical region S8, and the ninth optical region S9 are set to transmit light in different polarization directions (transmission polarization directions). This configuration is achieved by a combination of the spectral filter 16 and the polarization filter 18 having the following configurations.

Figure 3:
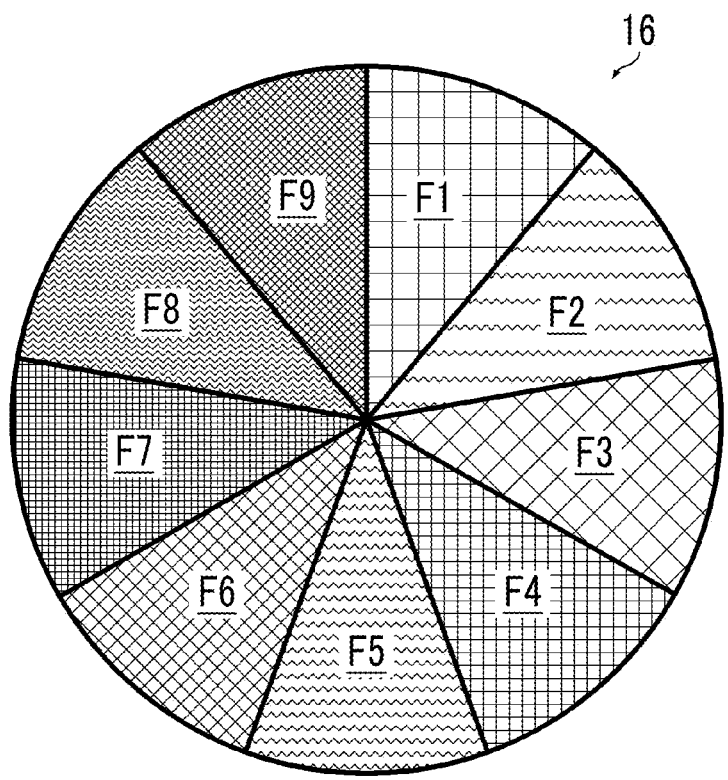
FIG. 3 is a front view illustrating a spectral filter.

FIG. 3 is a front view illustrating the spectral filter.

The spectral filter 16 has nine spectral filter units F1 to F9 which are nine equal parts divided in the circumferential direction. Hereinafter, as needed, the nine spectral filter units F1 to F9 are distinguished by defining the spectral filter unit represented by reference numeral F1 as a first spectral filter unit F1, the spectral filter unit represented by reference numeral F2 as a second spectral filter unit F2, the spectral filter unit represented by reference numeral F3 as a third spectral filter unit F3, the spectral filter unit represented by reference numeral F4 as a fourth spectral filter unit F4, the spectral filter unit represented by reference numeral F5 as a fifth spectral filter unit F5, the spectral filter unit represented by reference numeral F6 as a sixth spectral filter unit F6, the spectral filter unit represented by reference numeral F7 as a seventh spectral filter unit F7, the spectral filter unit represented by reference numeral F8 as an eighth spectral filter unit F8, and the spectral filter unit represented by reference numeral F9 as a ninth spectral filter unit F9. The spectral filter units F1 to F9 correspond to the optical regions S1 to S9 of the pupil division filter 14, respectively. That is, the first spectral filter unit F1 corresponds to the first optical region S1, the second spectral filter unit F2 corresponds to the second optical region S2, the third spectral filter unit F3 corresponds to the third optical region S3, the fourth spectral filter unit F4 corresponds to the fourth optical region S4, the fifth spectral filter unit F5 corresponds to the fifth optical region S5, the sixth spectral filter unit F6 corresponds to the sixth optical region S6, the seventh spectral filter unit F7 corresponds to the seventh optical region S7, the eighth spectral filter unit F8 corresponds to the eighth optical region S8, and the ninth spectral filter unit F9 corresponds to the ninth optical region S9.

The spectral filter units F1 to F9 are configured to transmit light in different wavelength bands. That is, the spectral filter units F1 to F9 have different spectral transmittance characteristics.

Figure 4:
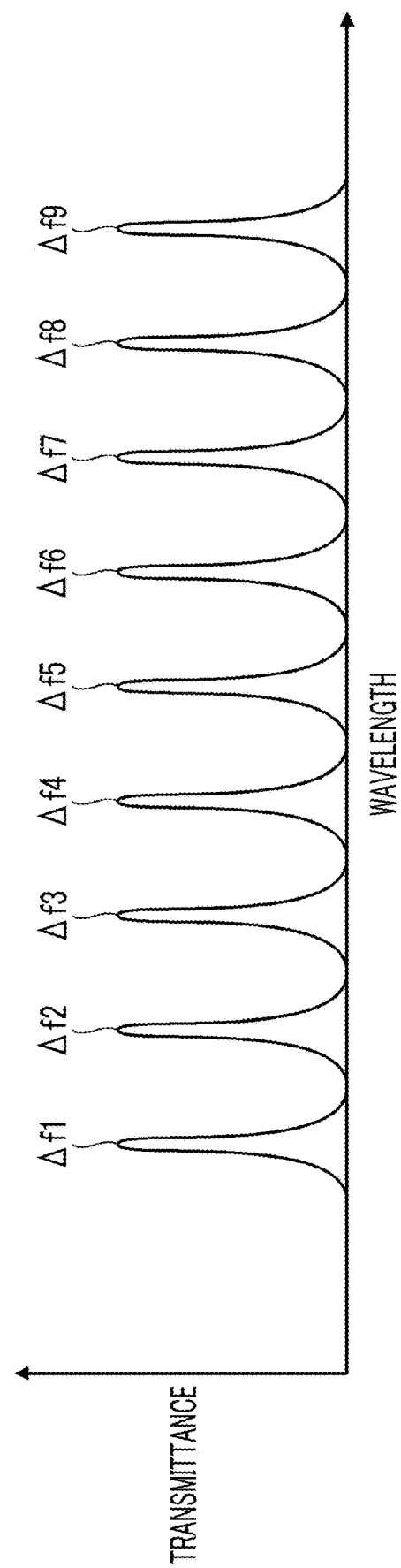
FIG. 4 is a graph illustrating an example of transmission wavelengths set in each spectral filter unit.

FIG. 4 is a graph illustrating an example of transmission wavelengths set in each of the spectral filter units.

It is assumed that the wavelength band of light transmitted by the first spectral filter unit F1 is a first wavelength band $\Delta f1$, the wavelength band of light transmitted by the second spectral filter unit F2 is a second wavelength band $\Delta f2$, the wavelength band of light transmitted by the third spectral filter unit F3 is a third wavelength band $\Delta f3$, the wavelength band of light transmitted by the fourth spectral filter unit F4 is a fourth wavelength band $\Delta f4$, the wavelength band of light transmitted by the fifth spectral filter unit F5 is a fifth wavelength band $\Delta f5$, the wavelength band of light transmitted by the sixth spectral filter unit F6 is a sixth wavelength band $\Delta f6$, the wavelength band of light transmitted by the seventh spectral filter unit F7 is a seventh wavelength band $\Delta f7$, the wavelength band of light transmitted by the eighth spectral filter unit F8 is an eighth wavelength band $\Delta f8$, and the wavelength band of light transmitted by the ninth spectral filter unit F9 is a ninth wavelength band $\Delta f9$. In the imaging device 1 according to this embodiment, the spectral filter units F1 to F9 are set to transmit light in a narrow band, particularly, nine bands within a specific wavelength band.

Figure 5:
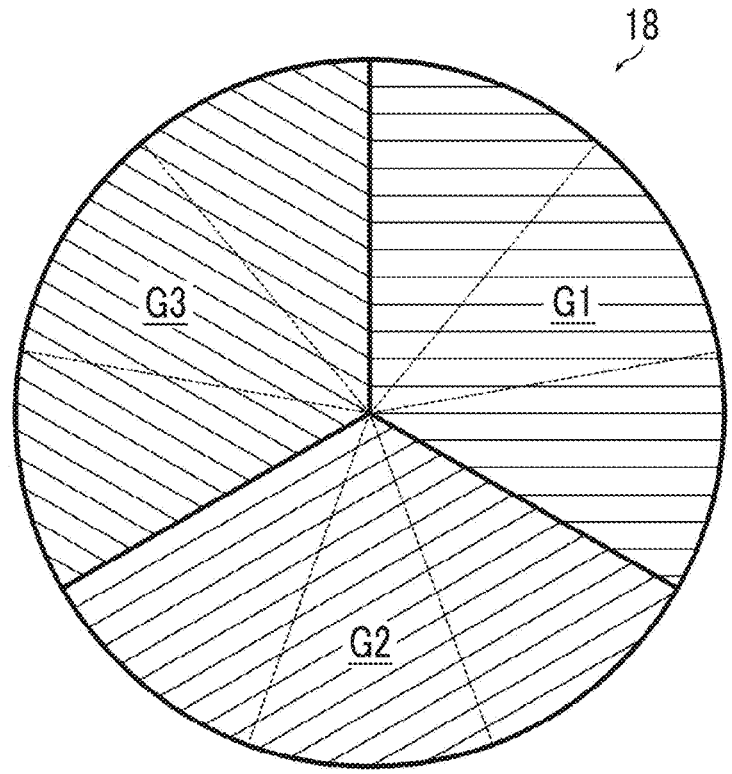
FIG. 5 is a front view illustrating a polarization filter.

FIG. 5 is a front view illustrating the polarization filter.

The polarization filter 18 has three polarization filter units G1 to G3 which are three equal parts divided in the circumferential direction. Hereinafter, as needed, the three polarization filter units G1 to G3 are distinguished by defining the polarization filter unit represented by reference numeral G1 as a first polarization filter unit G1, the polarization filter unit represented by reference numeral G2 as a second polarization filter unit G2, and the polarization filter unit represented by reference numeral G3 as a third polarization filter unit G3. The first polarization filter unit G1 corresponds to the first to third optical regions S1 to S3 of the pupil division filter 14. The second polarization filter unit G2 corresponds to the fourth to sixth optical regions S4 to S6 of the pupil division filter 14. The third polarization filter unit G3 corresponds to the seventh to ninth optical regions S7 to S9 of the pupil division filter 14.

Figure 6:
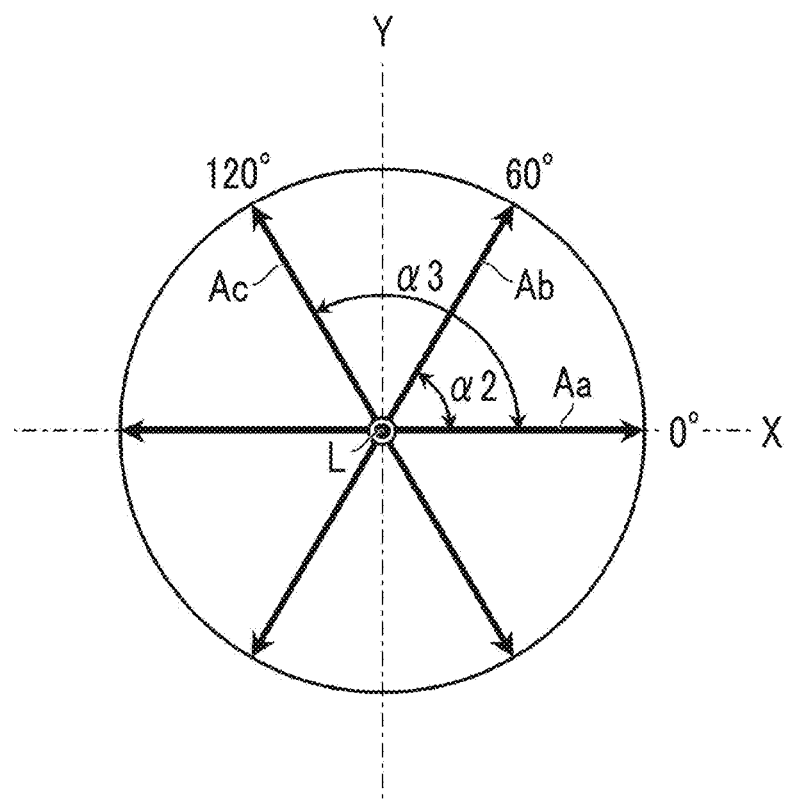
FIG. 6 is a diagram illustrating an example of polarization directions set in each polarization filter unit of the polarization filter.

FIG. 6 is a diagram illustrating an example of the polarization direction set in each polarization filter unit of the polarization filter.

The polarization direction (transmission polarization direction) is represented by an angle (azimuth angle) formed between a polarization transmission axis and the X-axis in the XY plane orthogonal to an optical axis L. In FIG. 6, reference letters Aa indicate the polarization transmission axis of the first polarization filter unit G1, reference letters Ab indicate the polarization transmission axis of the second polarization filter unit G2, and reference letters Ac indicate the polarization transmission axis of the third polarization filter unit G3. As illustrated in FIG. 6, the polarization filter units G1 to G3 are configured to transmit light in different polarization directions (transmission polarization directions). It is assumed that the polarization direction (transmission polarization direction) of light transmitted by the first polarization filter unit G1 is $\alpha 1$, the polarization direction (transmission polarization direction) of light transmitted by the second polarization filter unit G2 is $\alpha 2$, and the polarization direction (transmission polarization direction) of the light transmitted by the third polarization filter unit G3 is $\alpha 3$. In the imaging device 1 according to this embodiment, the first polarization filter unit G1 is set to transmit light having an azimuth angle of 0° ($\alpha 1=$) 0°, the second polarization filter unit G2 is set to transmit light having an azimuth angle of 60° ($\alpha 2=60°$), and the third polarization filter unit G3 is set to transmit light having an azimuth angle of 120° ($\alpha 3=120°$).

The pupil division filter 14 is configured by coaxially superimposing the spectral filter 16 and the polarization filter 18 having the above configurations. The pupil division filter 14 operates as follows. That is, the light passing through the first optical region S1 of the pupil division filter 14 passes through the first spectral filter unit F1 of the spectral filter 16 and the first polarization filter unit G1 of the polarization filter 18. Therefore, the light in the first wavelength band $\Delta f1$ is polarized (linearly polarized) in the polarization direction $\alpha 1$ and is emitted from the first optical region S1. In addition, the light passing through the second optical region S2 of the pupil division filter 14 passes through the second spectral filter unit F2 of the spectral filter 16 and the first polarization filter unit G1 of the polarization filter 18. Therefore, the light in the second wavelength band $\Delta f2$ is polarized (linearly polarized) in the polarization direction $\alpha 1$ and is emitted from the second optical region S2. Further, the light passing through the third optical region S3 of the pupil division filter 14 passes through the third spectral filter unit F3 of the spectral filter 16 and the first polarization filter unit G1 of the polarization filter 18. Therefore, the light in the third wavelength band $\Delta f3$ is polarized (linearly polarized) in the polarization direction $\alpha 1$ and is emitted from the third optical region S3. Furthermore, the light passing through the fourth optical region S4 of the pupil division filter 14 passes through the fourth spectral filter unit F4 of the spectral filter 16 and the second polarization filter unit G2 of the polarization filter 18. Therefore, the light in the fourth wavelength band $\Delta f4$ is polarized (linearly polarized) in the polarization direction $\alpha 2$ and is emitted from the fourth optical region S4. Moreover, the light passing through the fifth optical region S5 of the pupil division filter 14 passes through the fifth spectral filter unit F5 of the spectral filter 16 and the second polarization filter unit G2 of the polarization filter 18. Therefore, the light in the fifth wavelength band $\Delta f5$ is polarized (linearly polarized) in the polarization direction $\alpha 2$ and is emitted from the fifth optical region S5. In addition, the light passing through the sixth optical region S6 of the pupil division filter 14 passes through the sixth spectral filter unit F6 of the spectral filter 16 and the second polarization filter unit G2 of the polarization filter 18. Therefore, the light in the sixth wavelength band $\Delta f6$ is polarized (linearly polarized) in the polarization direction $\alpha 2$ and is emitted from the sixth optical region S6. Further, the light passing through the seventh optical region S7 of the pupil division filter 14 passes through the seventh spectral filter unit F7 of the spectral filter 16 and the third polarization filter unit G3 of the polarization filter 18. Therefore, the light in the seventh wavelength band $\Delta f7$ is polarized (linearly polarized) in the polarization direction $\alpha 3$ and is emitted from the seventh optical region S7. Furthermore, the light passing through the eighth optical region S8 of the pupil division filter 14 passes through the eighth spectral filter unit F8 of the spectral filter 16 and the third polarization filter unit G3 of the polarization filter 18. Therefore, the light in the eighth wavelength band $\Delta f8$ is polarized (linearly polarized) in the polarization direction $\alpha 3$ and is emitted from the eighth optical region S8. Moreover, the light passing through the ninth optical region S9 of the pupil division filter 14 passes through the ninth spectral filter unit F9 of the spectral filter 16 and the third polarization filter unit G3 of the polarization filter 18. Therefore, the light in the ninth wavelength band $\Delta f9$ is polarized (linearly polarized) in the polarization direction $\alpha 3$ and is emitted from the ninth optical region S9.

The entire optical system 10 is provided so as to be movable back and forth along the optical axis L. Therefore, focus is adjusted.

[Image Sensor]

Figure 7:
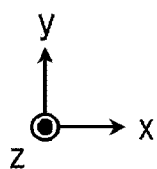
FIG. 7 is a diagram illustrating a schematic configuration of the arrangement of pixels in an image sensor.

FIG. 7 is a diagram illustrating a schematic configuration of the arrangement of the pixels in the image sensor.

As illustrated in FIG. 7, the image sensor 100 has a plurality of pixels Pi (i=1, 2, 3, 4, 5, 6, 7, 8, 9) on its light receiving surface. The pixels Pi are regularly arranged at a constant pitch along the horizontal direction (x direction) and the vertical direction (y direction).

In the image sensor 100 according to this embodiment, one pixel block PB(x, y) is composed of nine (3×3) adjacent pixels Pi. The pixel blocks PB(x, y) are regularly arranged along the horizontal direction (x direction) and the vertical direction (y direction). Hereinafter, as needed, the nine pixels comprised in one pixel block PB(x, y) are distinguished by defining the pixel represented by reference numeral P1 as a first pixel P1, the pixel represented by reference numeral P2 as a second pixel P2, the pixel represented by reference numeral P3 as a third pixel P3, the pixel represented by reference numeral P4 as a fourth pixel P4, the pixel represented by reference numeral P5 as a fifth pixel P5, the pixel represented by reference numeral P6 as a sixth pixel P6, the pixel represented by reference numeral P7 as a seventh pixel P7, the pixel represented by reference numeral P8 as an eighth pixel P8, and the pixel represented by reference numeral P9 as a ninth pixel P9. The pixels Pi receive light having different characteristics.

Figure 8:
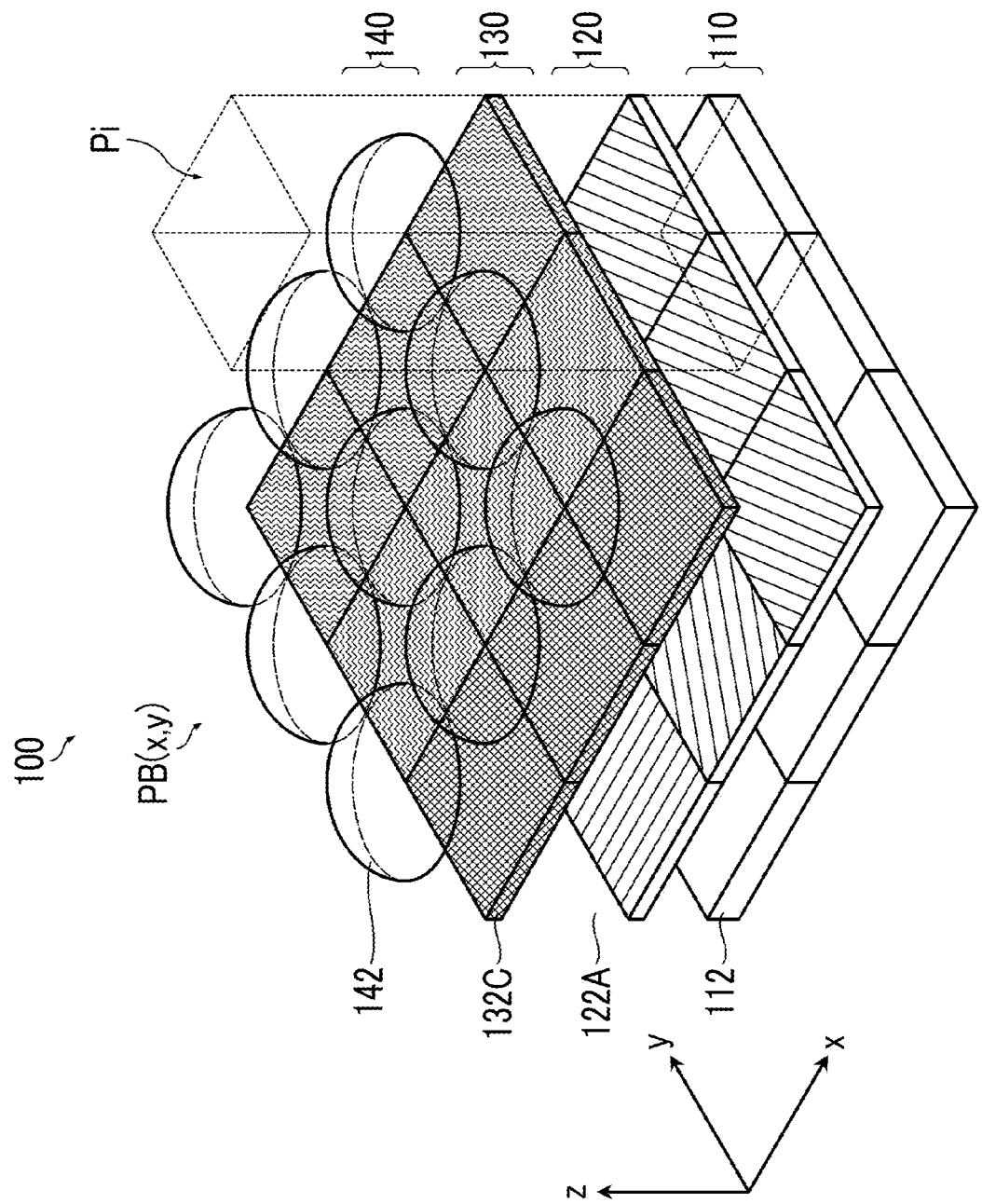
FIG. 8 is a diagram illustrating a schematic configuration of the image sensor.
Figure 9:
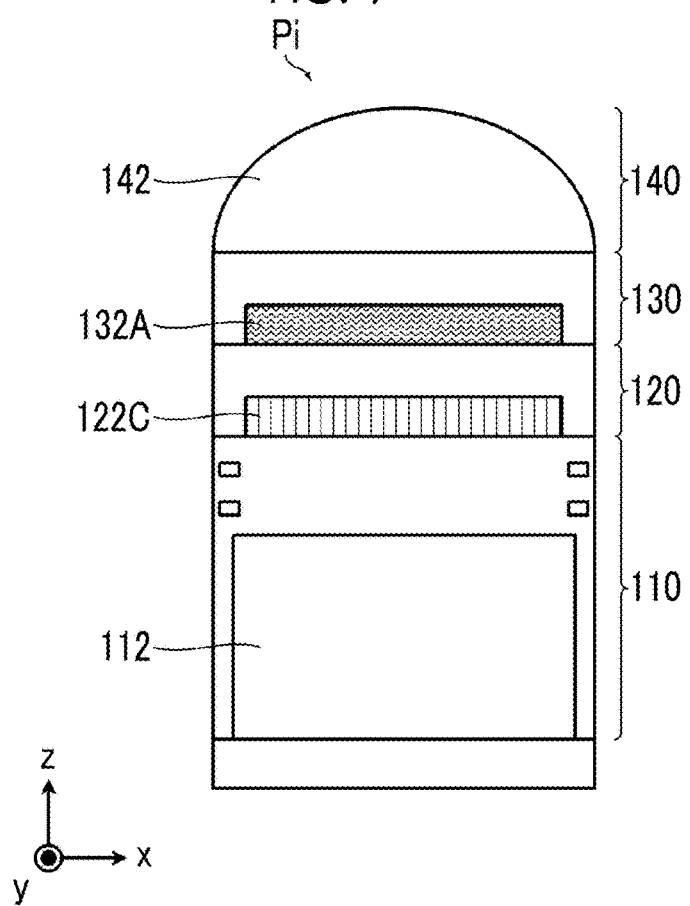
FIG. 9 is a cross-sectional view illustrating a schematic configuration of one pixel (a portion represented by a dashed line in FIG. 8).

FIG. 8 is a diagram illustrating a schematic configuration of the image sensor. FIG. 9 is a cross-sectional view illustrating a schematic configuration of one pixel (a portion represented by a dashed line in FIG. 8).

The image sensor 100 includes a pixel array layer 110, a polarization filter element array layer 120, a spectral filter element array layer 130, and a microlens array layer 140. The layers are disposed in the order of the pixel array layer 110, the polarization filter element array layer 120, the spectral filter element array layer 130, and the microlens array layer 140 from an image plane to an object.

The pixel array layer 110 is configured by two-dimensionally arranging a large number of photodiodes 112. One photodiode 112 constitutes one pixel. The photodiodes 112 are regularly arranged along the horizontal direction (x direction) and the vertical direction (y direction).

The polarization filter element array layer 120 is configured by two-dimensionally arranging three types of polarization filter elements 122A, 122B, and 122C having different polarization directions (transmission polarization directions). Hereinafter, as needed, the three types of polarization filter elements 122A, 122B and 122C are distinguished by defining the polarization filter element represented by reference numeral 122A as a first polarization filter element 122A, the polarization filter element represented by reference numeral 122B as a second polarization filter element 122B, and the polarization filter element represented by reference numeral 122C as a third polarization filter element 122C. Each of the polarization filter elements 122A, 122B, and 122C is disposed at the same interval as the photodiodes 112 and is comprised in each pixel. It is assumed that the polarization direction (transmission polarization direction) of light transmitted by the first polarization filter element 122A is β1, the polarization direction (transmission polarization direction) of light transmitted by the second polarization filter element 122B is β2, and the polarization direction (transmission polarization direction) of light transmitted by the third polarization filter element 122C is β3. In the imaging device 1 according to this embodiment, the first polarization filter element 122A is set to transmit light having an azimuth angle of 0° (β=0°), the second polarization filter element 122B is set to transmit light having an azimuth angle of 60° (β2=60°), and the third polarization filter element 122C is set to transmit light having an azimuth angle of 120° (β3=120°). The polarization filter elements 122A, 122B, and 122C are examples of a second optical filter element.

In each pixel block PB(x, y), the polarization filter elements 122A, 122B, and 122C are regularly arranged.

Figure 10:
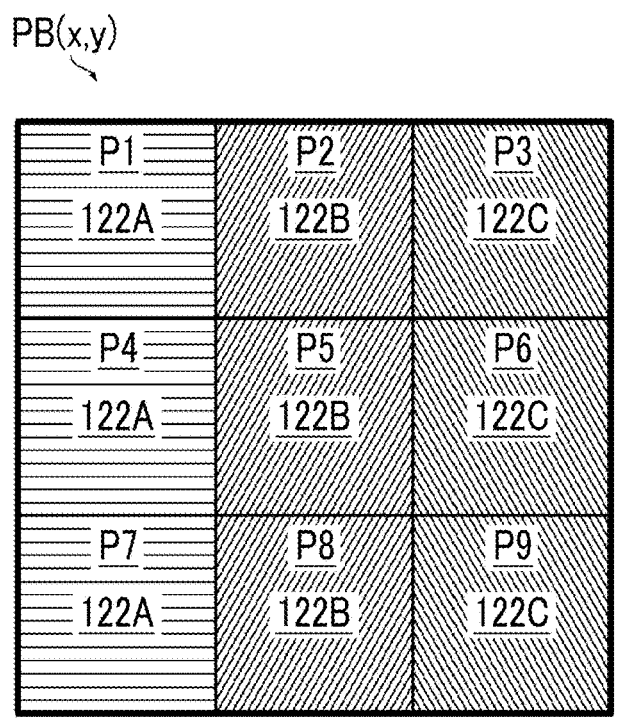
FIG. 10 is a diagram illustrating an example of the arrangement pattern of polarization filter elements comprised in each pixel block.

FIG. 10 is a diagram illustrating an example of the arrangement pattern of the polarization filter elements comprised in each pixel block.

As illustrated in FIG. 10, in the imaging device 1 according to this embodiment, the first polarization filter elements 122A are comprised in the first pixel P1, the fourth pixel P4, and the seventh pixel P7 which are pixels in the first column in the pixel block, the second polarization filter elements 122B are comprised in the second pixel P2, the fifth pixel P5, and the eighth pixel P8 which are pixels in the second column in the pixel block, and the third polarization filter elements 122C are comprised in the third pixel P3, the sixth pixel P6, and the ninth pixel P9 which are pixels in the third column in the pixel block.

The spectral filter element array layer 130 is configured by two-dimensionally arranging three types of spectral filter elements 132A, 132B, and 132C having different spectral transmittances. Hereinafter, as needed, the three types of spectral filter elements 132A, 132B, and 132C are distinguished by defining the spectral filter element represented by reference numeral 132A as a first spectral filter element 132A, the spectral filter element represented by reference numeral 132B as a second spectral filter element 132B, and the spectral filter element represented by reference numeral 132C as a third spectral filter element 132C. Each of the spectral filter elements 132A, 132B, and 132C is disposed at the same interval as the photodiodes 112 and is comprised in each pixel. The spectral filter elements 132A, 132B, and 132C are examples of a first optical filter element.

Figure 11:
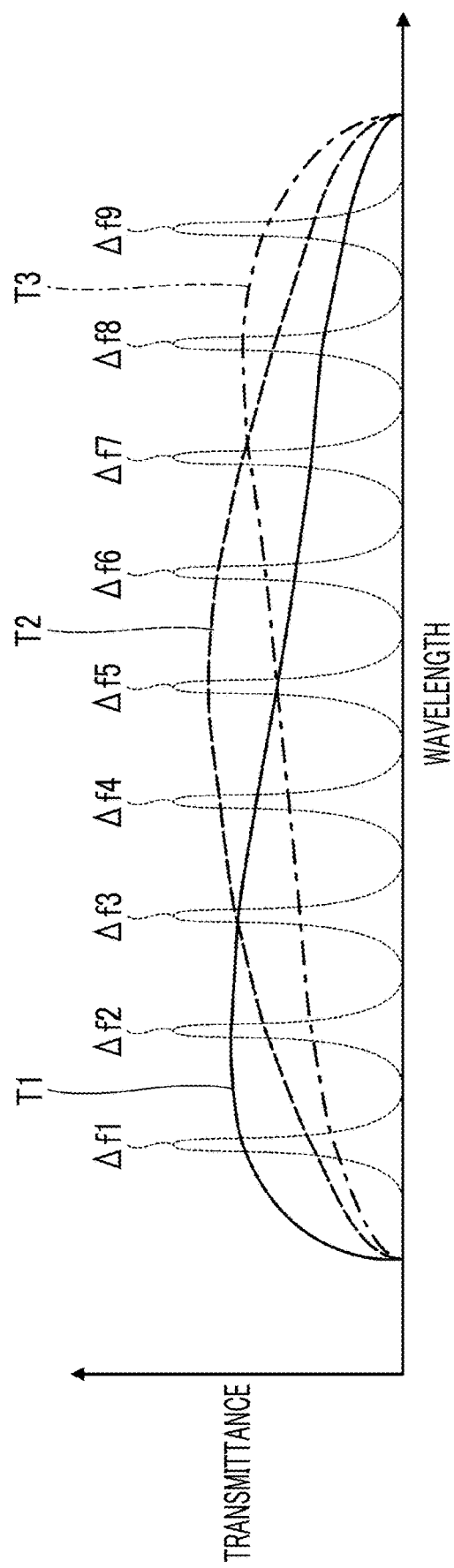
FIG. 11 is a graph illustrating an example of the setting of the spectral transmittance of each spectral filter element.

FIG. 11 is a graph illustrating an example of the setting of the spectral transmittance of each spectral filter element.

In FIG. 11, a graph T1 represented by a solid line is a graph of the spectral transmittance of the first spectral filter element 132A. In addition, a graph T2 represented by a dashed line is a graph of the spectral transmittance of the second spectral filter element 132B. Further, a graph T3 represented by a one-dot chain line is a graph of the spectral transmittance of the third spectral filter element 132C.

As illustrated in FIG. 11, each of the spectral filter elements 132A, 132B, and 132C has a configuration in which the light transmitted through each of the spectral filter units F1 to F9 of the spectral filter 16 comprised in the optical system 10 is transmitted with different transmittances. In particular, in the imaging device 1 according to this embodiment, the first spectral filter element 132A has the characteristic that it transmits more light in a short wavelength band. The second spectral filter element 132B has the characteristic that it transmits more light in an intermediate wavelength band. The third spectral filter element 132C has the characteristic that it transmits more light in a long wavelength band.

Figure 12:
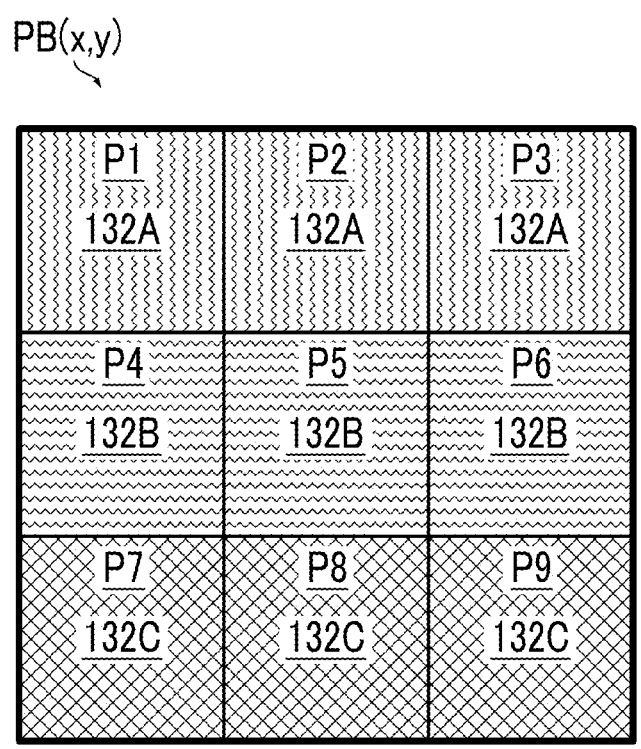
FIG. 12 is a diagram illustrating an example of the arrangement pattern of spectral filter elements comprised in each pixel block.

FIG. 12 is a diagram illustrating an example of the arrangement pattern of the spectral filter elements comprised in each pixel block.

As illustrated in FIG. 12, the spectral filter elements 132A, 132B, and 132C are regularly arranged in each pixel block PB(x, y). In the imaging device 1 according to this embodiment, the first pixel P1, the second pixel P2, and the third pixel P3 which are pixels in the first row in the pixel block comprise the first spectral filter elements 132A, the fourth pixel P4, the fifth pixel P5, and the sixth pixel P6 which are pixels in the second row in the pixel block comprise the second spectral filter elements 132B, and the seventh pixel P7, the eighth pixel P8, and the ninth pixel P9 which are pixels in the third row in the pixel block comprise the third spectral filter elements 132C.

The microlens array layer 140 is configured by two-dimensionally arranging a large number of microlenses 142. Each of the microlenses 142 is disposed at the same interval as the photodiodes 112 and is comprised in each pixel. The microlens 142 is comprised in order to efficiently focus light from the optical system 10 on the photodiode 112.

In the image sensor 100 having the above mentioned configuration, in each pixel block PB(x, y), each pixel Pi receives light from the optical system 10 as follows. That is, the first pixel P1 receives light from the optical system 10 through the first spectral filter element 132A and the first polarization filter element 122A. In addition, the second pixel P2 receives light from the optical system 10 through the first spectral filter element 132A and the second polarization filter element 122B. Further, the third pixel P3 receives light from the optical system 10 through the first spectral filter element 132A and the third polarization filter element 122C. Furthermore, the fourth pixel P4 receives light from the optical system 10 through the second spectral filter element 132B and the first polarization filter element 122A. Moreover, the fifth pixel P5 receives light from the optical system 10 through the second spectral filter element 132B and the second polarization filter element 122B. In addition, the sixth pixel P6 receives light from the optical system 10 through the second spectral filter element 132B and the third polarization filter element 122C. Further, the seventh pixel P7 receives light from the optical system 10 through the third spectral filter element 132C and the first polarization filter element 122A. Furthermore, the eighth pixel P8 receives light from the optical system 10 through the third spectral filter element 132C and the second polarization filter element 122B. Moreover, the ninth pixel P9 receives light from the optical system 10 through the third spectral filter element 132C and the third polarization filter element 122C. As such, the pixels Pi of the pixel block PB(x, y) have different combinations of the spectral filter elements 132A, 132B, and 132C and the polarization filter elements 122A, 122B, and 122C and receive light having different characteristics.

[Signal Processing Unit]

The signal processing unit 200 processes the signal output from the image sensor 100 to generate image data acquired by each optical region Sj of the optical system 10.

Figure 13:
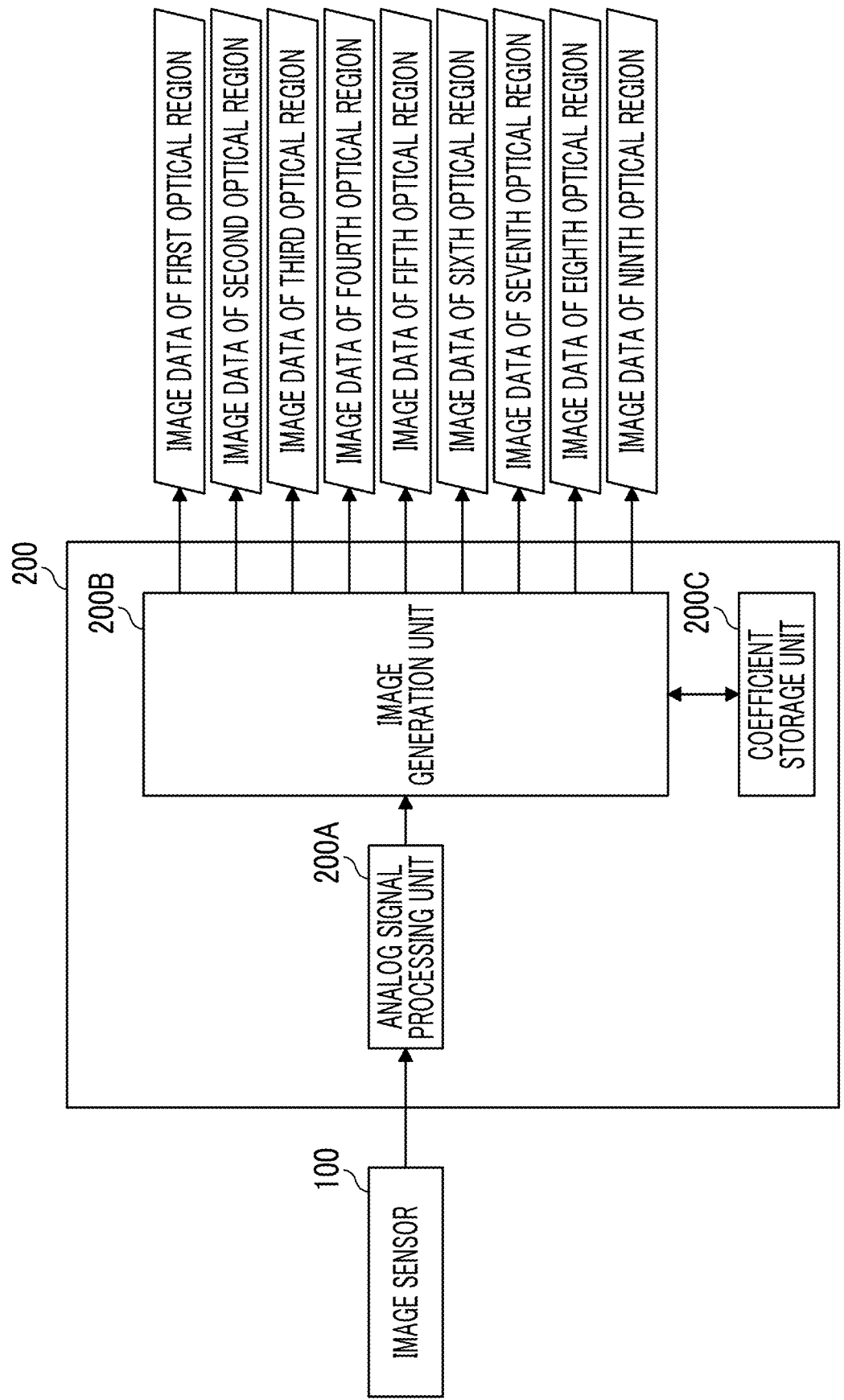
FIG. 13 is a block diagram illustrating a schematic configuration of a signal processing unit.

FIG. 13 is a block diagram illustrating a schematic configuration of the signal processing unit.

As illustrated in FIG. 13, the signal processing unit 200 includes an analog signal processing unit 200A, an image generation unit 200B, and a coefficient storage unit 200C.

The analog signal processing unit 200A acquires an analog pixel signal output from each pixel of the image sensor 100, performs predetermined signal processing (for example, a correlated double sampling process or an amplification process), converts the analog pixel signal into a digital signal, and outputs the digital signal.

The image generation unit 200B performs predetermined signal processing on the pixel signal converted into the digital signal to generate image data corresponding to each optical regions Sj. That is, the image data of the image acquired by each optical region Sj is generated.

Figure 14:
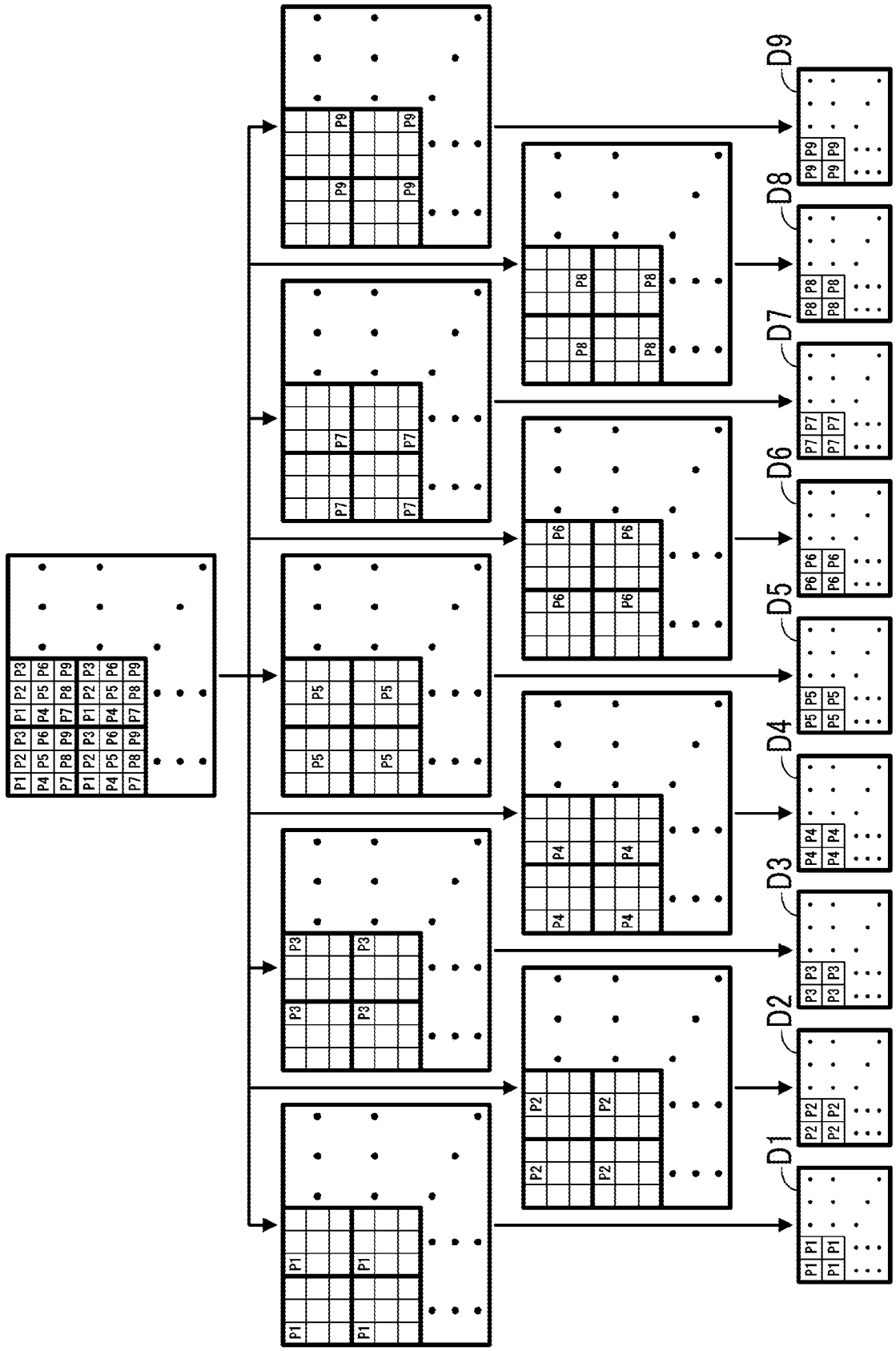
FIG. 14 is a conceptual diagram illustrating image generation.

FIG. 14 is a conceptual diagram illustrating image generation.

Each pixel block PB(x, y) includes the first pixel P1, the second pixel P2, the third pixel P3, the fourth pixel P4, the fifth pixel P5, the sixth pixel P6, the seventh pixel P7, the eighth pixel P8, and the ninth pixel P9. Therefore, the pixel signals of the first pixel P1, the second pixel P2, the third pixel P3, the fourth pixel P4, the fifth pixel P5, the sixth pixel P6, the seventh pixel P7, the eighth pixel P8, and the ninth pixel P9 are separated and extracted from each pixel block PB(x, y) to generate nine image data items D1 to D9.

That is, the pixel signal of the first pixel P1 is separated and extracted from each pixel block PB(x, y) to generate the first image data D1. In addition, the pixel signal of the second pixel P2 is separated and extracted from each pixel block PB(x, y) to generate the second image data D2. Further, the pixel signal of the third pixel P3 is separated and extracted from each pixel block PB(x, y) to generate the third image data D3. Furthermore, the pixel signal of the fourth pixel P4 is separated and extracted from each pixel block PB(x, y) to generate the fourth image data D4. Moreover, the pixel signal of the fifth pixel P5 is separated and extracted from each pixel block PB(x, y) to generate the fifth image data D5. In addition, the pixel signal of the sixth pixel P6 is separated and extracted from each pixel block PB(x, y) to generate the sixth image data D6. Further, the pixel signal of the seventh pixel P7 is separated and extracted from each pixel block PB(x, y) to generate the seventh image data D7. Furthermore, the pixel signal of the eighth pixel P8 is separated and extracted from each pixel block PB(x, y) to generate the eighth image data D8. Moreover, the pixel signal of the ninth pixel P9 is separated and extracted from each pixel block PB(x, y) to generate the ninth image data D9.

However, crosstalk occurs in the nine image data items D1 to D9. That is, since light from each optical region Sj of the optical system 10 is incident on each pixel Pi, the generated image is an image in which the images of each optical region Sj are mixed at a predetermined ratio. Therefore, the image generation unit 200B performs the following arithmetic processing to remove crosstalk.

Here, it is assumed that the pixel signal (signal value) obtained by the first pixel P1 of each pixel block PB(x, y) is x1, the pixel signal obtained by the second pixel P2 is x2, the pixel signal obtained by the third pixel P3 is x3, the pixel signal obtained by the fourth pixel P4 is x4, the pixel signal obtained by the fifth pixel P5 is x5, the pixel signal obtained by the sixth pixel P6 is x6, the pixel signal obtained by the seventh pixel P7 is x7, the pixel signal obtained by the eighth pixel P8 is x8, and the pixel signal obtained by the ninth pixel P9 is x9. Nine pixel signals x1 to x9 are obtained from each pixel block PB(x, y). The image generation unit 200B calculates nine pixel signals X1 to X9 respectively corresponding to the optical regions S1 to S9 from the nine pixel signals x1 to x9 with the following Expression 1 using a matrix A to remove crosstalk.

$$A = \begin{bmatrix} a11 & a12 & a13 & a14 & a15 & a16 & a17 & a18 & a19 \\ a21 & a22 & a23 & a24 & a25 & a26 & a27 & a28 & a29 \\ a31 & a32 & a33 & a34 & a35 & a36 & a37 & a38 & a39 \\ a41 & a42 & a43 & a44 & a45 & a46 & a47 & a48 & a49 \\ a51 & a52 & a53 & a54 & a55 & a56 & a57 & a58 & a59 \\ a61 & a62 & a63 & a64 & a65 & a66 & a67 & a68 & a69 \\ a71 & a72 & a73 & a74 & a75 & a76 & a77 & a78 & a79 \\ a81 & a82 & a83 & a84 & a85 & a86 & a87 & a88 & a89 \\ a91 & a92 & a93 & a94 & a95 & a96 & a97 & a98 & a99 \end{bmatrix}$$

$$\begin{bmatrix} X1 \\ X2 \\ X3 \\ X4 \\ X5 \\ X6 \\ X7 \\ X8 \\ X9 \end{bmatrix} = \begin{bmatrix} a11 & a12 & a13 & a14 & a15 & a16 & a17 & a18 & a19 \\ a21 & a22 & a23 & a24 & a25 & a26 & a27 & a28 & a29 \\ a31 & a32 & a33 & a34 & a35 & a36 & a37 & a38 & a39 \\ a41 & a42 & a43 & a44 & a45 & a46 & a47 & a48 & a49 \\ a51 & a52 & a53 & a54 & a55 & a56 & a57 & a58 & a59 \\ a61 & a62 & a63 & a64 & a65 & a66 & a67 & a68 & a69 \\ a71 & a72 & a73 & a74 & a75 & a76 & a77 & a78 & a79 \\ a81 & a82 & a83 & a84 & a85 & a86 & a87 & a88 & a89 \\ a91 & a92 & a93 & a94 & a95 & a96 & a97 & a98 & a99 \end{bmatrix} *$$

Expression 1

$$\begin{bmatrix} x1 \\ x2 \\ x3 \\ x4 \\ x5 \\ x6 \\ x7 \\ x8 \\ x9 \end{bmatrix}$$

In addition, the pixel signal X1 is a pixel signal corresponding to the first optical region S1, the pixel signal X2 is a pixel signal corresponding to the second optical region S2, the pixel signal X3 is a pixel signal corresponding to the third optical region S3, the pixel signal X4 is a pixel signal corresponding to the fourth optical region S4, the pixel signal X5 is a pixel signal corresponding to the fifth optical region S5, the pixel signal X6 is a pixel signal corresponding to the sixth optical region S6, the pixel signal X7 is a pixel signal corresponding to the seventh optical region S7, the pixel signal X8 is a pixel signal corresponding to the eighth optical region S8, and the pixel signal X9 is a pixel signal corresponding to the ninth optical region S9. Therefore, the image acquired by the first optical region S1 is generated from the pixel signal X1, the image acquired by the second optical region S2 is generated from the pixel signal X2, the image acquired by the third optical region S3 is generated from the pixel signal X3, the image acquired by the fourth optical region S4 is generated from the pixel signal X4, the image acquired by the fifth optical region S5 is generated from the pixel signal X5, the image acquired by the sixth optical region S6 is generated from the pixel signal X6, the image acquired by the seventh optical region S7 is generated from the pixel signal X7, the image acquired by the eighth optical region S8 is generated from the pixel signal X8, and the image acquired by the ninth optical region S9 is generated from the pixel signal X9.

Hereinafter, the reason why crosstalk can be removed by Expression 1 will be described.

Crosstalk occurs due to the mixture of light from each optical region Sj into each pixel Pi. In addition, assuming that the ratio (the amount of crosstalk (also referred to as a crosstalk ratio)) at which light incident on a j-th optical region Sj (j=1 to 9) of the optical system 10 is received by an i-th pixel Pi (i=1 to 9) of each pixel block PB(x, y) is bij (i=1 to 9, j=1 to 9), the following relationship is established between a pixel signal xi obtained by each pixel Pi of each pixel block PB(x, y) and a pixel signal Xj corresponding to each optical region Sj of the optical system 10.

That is, the following Expression 2 is established for the pixel signal x1 obtained by the first pixel P1 ("*" is a symbol for integration).

$b11*X1+b12*X2+b13*X3+b14*X4+b15*X5+b16*X6+b17*X7+b18*X8+b19*X9=x1$     Expression 2

In addition, the following Expression 3 is established for the pixel signal x2 obtained by the second pixel P2.

$b21*X1+b22*X2+b23*X3+b24*X4+b25*X5+b26*X6+b27*X7+b28*X8+b29*X9=x2$     Expression 3

Further, the following Expression 4 is established for pixel signal x3 obtained by the third pixel P3.

$b31*X1+b32*X2+b33*X3+b34*X4+b35*X5+b36*X6+b37*X7+b38*X8+b39*X9=x3$     Expression 4

Furthermore, the following Expression 5 is established for the pixel signal x4 obtained by the fourth pixel P4.

$b41*X1+b42*X2+b43*X3+b44*X4+b45*X5+b46*X6+b47*X7+b48*X8+b49*X9=x4$     Expression 5

Moreover, the following Expression 6 is established for the pixel signal x5 obtained by the fifth pixel P5.

$b51*X1+b52*X2+b53*X3+b54*X4+b55*X5+b56*X6+b57*X7+b58*X8+b59*X9=x5$     Expression 6

In addition, the following Expression 7 is established for the pixel signal x6 obtained by the sixth pixel P6.

$b61*X1+b62*X2+b63*X3+b64*X4+b65*X5+b66*X6+b67*X7+b68*X8+b69*X9=x6$     Expression 7

Further, the following Expression 8 is established for the pixel signal x7 obtained by the seventh pixel P7.

$b71*X1+b72*X2+b73*X3+b74*X4+b75*X5+b76*X6+b77*X7+b78*X8+b79*X9=x7$     Expression 8

Furthermore, the following Expression 9 is established for the pixel signal x8 obtained by the eighth pixel P8.

$b81*X1+b82*X2+b83*X3+b84*X4+b85*X5+b86*X6+b87*X7+b88*X8+b89*X9=x8$     Expression 9

Moreover, the following Expression 10 is established for the pixel signal x9 obtained by the ninth pixel P9.

$b91*X1+b92*X2+b93*X3+b94*X4+b95*X5+b96*X6+b97*X7+b98*X8+b99*X9=x9$     Expression 10

For X1 to X9, the simultaneous equations of Expressions 2 to 10 can be solved to acquire the pixel signal of the original image, that is, the pixel signals X1 to X9 respectively corresponding to the optical regions S1 to S9.

Here, the simultaneous equations can be represented by the following Expression 11 using a matrix B.

$$B = \begin{bmatrix} b11 & b12 & b13 & b14 & b15 & b16 & b17 & b18 & b19 \\ b21 & b22 & b23 & b24 & b25 & b26 & b27 & b28 & b29 \\ b31 & b32 & b33 & b34 & b35 & b36 & b37 & b38 & b39 \\ b41 & b42 & b43 & b44 & b45 & b46 & b47 & ba48 & b49 \\ b51 & b52 & b53 & b54 & b55 & b56 & b57 & b58 & b59 \\ b61 & b62 & b63 & b64 & b65 & b66 & b67 & b68 & b69 \\ b71 & b72 & b73 & b74 & b75 & b76 & b77 & b78 & b79 \\ b81 & b82 & b83 & b84 & b85 & b86 & b87 & b88 & b89 \\ b91 & b92 & b93 & b94 & b95 & b96 & b97 & b98 & b99 \end{bmatrix}$$

$$\begin{bmatrix} b11 & b12 & b13 & b14 & b15 & b16 & b17 & b18 & b19 \\ b21 & b22 & b23 & b24 & b25 & b26 & b27 & b28 & b29 \\ b31 & b32 & b33 & b34 & b35 & b36 & b37 & b38 & b39 \\ b41 & b42 & b43 & b44 & b45 & b46 & b47 & b48 & b49 \\ b51 & b52 & b53 & b54 & b55 & b56 & b57 & b58 & b59 \\ b61 & b62 & b63 & b64 & b65 & b66 & b67 & b68 & b69 \\ b71 & b72 & b73 & b74 & b75 & b76 & b77 & b78 & b79 \\ b81 & b82 & b83 & b84 & b85 & b86 & b87 & b88 & b89 \\ b91 & b92 & b93 & b94 & b95 & b96 & b97 & b98 & b99 \end{bmatrix} *$$     Expression 11

$$\begin{bmatrix} X1 \\ X2 \\ X3 \\ X4 \\ X5 \\ X6 \\ X7 \\ X8 \\ X9 \end{bmatrix} = \begin{bmatrix} x1 \\ x2 \\ x3 \\ x4 \\ x5 \\ x6 \\ x7 \\ x8 \\ x9 \end{bmatrix}$$

X1 to X9 which are the solutions of the simultaneous equations of Expressions 2 to 10 are calculated by multiplying both sides of Expression 11 by an inverse matrix $B^{-1}$ of the matrix B.

$$\begin{bmatrix} X1 \\ X2 \\ X3 \\ X4 \\ X5 \\ X6 \\ X7 \\ X8 \\ X9 \end{bmatrix} = \begin{bmatrix} b11 & b12 & b13 & b14 & b15 & b16 & b17 & b18 & b19 \\ b21 & b22 & b23 & b24 & b25 & b26 & b27 & b28 & b29 \\ b31 & b32 & b33 & b34 & b35 & b36 & b37 & b38 & b39 \\ b41 & b42 & b43 & b44 & b45 & b46 & b47 & b48 & b49 \\ b51 & b52 & b53 & b54 & b55 & b56 & b57 & b58 & b59 \\ b61 & b62 & b63 & b64 & b65 & b66 & b67 & b68 & b69 \\ b71 & b72 & b73 & b74 & b75 & b76 & b77 & b78 & b79 \\ b81 & b82 & b83 & b84 & b85 & b86 & b87 & b88 & b89 \\ b91 & b92 & b93 & b94 & b95 & b96 & b97 & b98 & b99 \end{bmatrix}^{-1} * \begin{bmatrix} x1 \\ x2 \\ x3 \\ x4 \\ x5 \\ x6 \\ x7 \\ x8 \\ x9 \end{bmatrix}$$

Expression 12

As such, the pixel signals X1 to X9 respectively corresponding to the optical regions S1 to S9 can be calculated from the signal values (pixel signals) x1 to x9 of the pixels P1 and P9 on the basis of the ratio at which the light incident on each of the optical regions S1 to S9 of the optical system 10 is received by each of the pixels P1 to P9 of the pixel block PB(x, y).

Expression 1 is obtained by setting the inverse matrix $B^{-1}$ of Expression 12 as the matrix A ($B^{-1}$=A). Therefore, each element aij of the matrix A in Expression 12 can be acquired by calculating the inverse matrix $B^{-1}$ of the matrix B. Each element bij (i=1 to 9, j=1 to 9) of the matrix B is the ratio (the amount of crosstalk) at which the light incident on the j-th optical region Sj (j=1 to 9) of the optical system 10 is received by the i-th pixel Pi (i=1 to 9) of each pixel block PB (x, y). In a case in which the transmittance based on polarization is c and the transmittance based on spectral transmittance is d, this ratio is calculated by the product of the transmittance c and the transmittance d.

Here, the transmittance c based on polarization is calculated by the square of the cosine of an angular difference between the transmission polarization direction of the light transmitted through the optical region and the transmission polarization direction of the light received by the pixel.

Further, the transmittance d based on spectral transmittance is calculated on the basis of the wavelength band of the light transmitted through the optical region and the spectral transmittance of the spectral filter element comprised in the pixel.

For example, in the relationship between the j-th optical region Sj of the optical system 10 and the i-th pixel Pi of the image sensor 100, in a case in which the transmission polarization direction of the light transmitted through the j-th optical region Sj is θj and the transmission polarization direction of the light received by the i-th pixel Pi is (Di, the transmittance c based on polarization is calculated by the square of the cosine (cos) of the angular difference ($|\theta j - \Phi i|$) therebetween ($\cos^2(|\theta j - \Phi i|)$).

In addition, the transmittance d based on spectral transmittance is calculated on the basis of the wavelength band of the light transmitted through the j-th optical region Sj and the spectral transmittances of the spectral filter element 132A, 132B, or 132C comprised in the i-th pixel Pi. That is, the transmittance d based on spectral transmittance is calculated from the wavelength band of the light transmitted through the j-th optical region Sj on the basis of the spectral transmittance of the spectral filter element 132A, 132B, or 132C comprised in the i-th pixel Pi.

In the imaging device 1 according to this embodiment, the transmission polarization direction of the light transmitted through the first optical region S1, the second optical region S2, and the third optical region S3 is α1, the transmission polarization direction of the light transmitted through the fourth optical region S4, the fifth optical region S5, and the sixth optical region S6 is α2, and the transmission polarization direction of the light transmitted through the seventh optical region S7, the eighth optical region S8, and the ninth optical region S9 is α3. Further, the transmission polarization direction of the light received by the first pixel P1, the fourth pixel P4, and the seventh pixel P7 of each pixel block PB(x, y) is β1, the transmission polarization direction of the light received by the second pixel P2, the fifth pixel P5, and the eighth pixel P8 is β2, and the transmission polarization direction of the light received by the third pixel P3, the sixth pixel P6, and the ninth pixel P9 is β3.

Therefore, the transmittance c based on polarization between the first optical region S1, the second optical region S2, and the third optical region S3 and each of the pixels P1 to P9 is calculated as follows: $c=(\cos^2(|\alpha 1-\beta 1|))$ for the first pixel P1; $c=(\cos^2(|\alpha 1-\beta 2|))$ for the second pixel P2; $c=(\cos^2(|\alpha 1-\beta 3|))$ for the third pixel P3; $c=(\cos^2(|\alpha 1-\beta 1|))$ for the fourth pixel P4; $c=(\cos^2(|\alpha 1-\beta 2|))$ for the fifth pixel P5; $c=(\cos^2(|\alpha 1-\beta 3|))$ for the sixth pixel P6; $c=(\cos^2(|\alpha 1-\beta 1|))$ for the seventh pixel P7; $c=(\cos^2(|\alpha 1-\beta 2|))$ for the eighth pixel P8; and $c=(\cos^2(|\alpha 1-\beta 3|))$ for the ninth pixel P9.

Further, the transmittance c based on polarization between the fourth optical region S4, the fifth optical region S5, and the sixth optical region S6 and each of the pixels P1 to P9 is calculated as follows: $c=(\cos^2(|\alpha 2-\beta 1|)$ for the first pixel P1; $c=(\cos^2(|\alpha 2-\beta 2|))$ for the second pixel P2; $c=(\cos^2(|\alpha 2-\beta 3|))$ for the third pixel P3; $c=(\cos^2(\alpha 2-\beta 1|))$ for the fourth pixel P4; $c=(\cos^2(|\alpha 2-\beta 2|))$ for the fifth pixel P5; $c=(\cos^2(|\alpha 2-\beta 3|))$ for the sixth pixel P6; $c=(\cos^2(|\alpha 2-\beta 1|))$ for the seventh pixel P7; $c=(\cos^2(|\alpha 2-\beta 2|))$ for the eighth pixel P8; and $c=(\cos^2(|\alpha 2-\beta 3|))$ for the ninth pixel P9.

Furthermore, the transmittance c based on polarization between the seventh optical region S7, the eighth optical region S8, and the ninth optical region S9 and each of the pixels P1 to P9 is calculated as follows: $c=(\cos^2(|\alpha3-\beta1|))$ for the first pixel P1; $c=(\cos^2(|\alpha3-\beta2|))$ for the second pixel P2; $c=(\cos^2(|\alpha3-\beta3|))$ for the third pixel P3; $c=(\cos^2(|\alpha3-\beta1|))$ for the fourth pixel P4; $c=(\cos^2(|\alpha3-\beta2|))$ for the fifth pixel P5; $c=(\cos^2(|\alpha3-\beta3|))$ for the sixth pixel P6; $c=(\cos^2(|\alpha3-\beta1|))$ for the seventh pixel P7; $c=(\cos^2(|\alpha3-\beta2|))$ for the eighth pixel P8; and $c=(\cos^2(|\alpha3-\beta3|))$ for the ninth pixel P9.

In this embodiment, since $\alpha1=0°$, $\alpha2=60°$, $\alpha3=120°$, $\beta1=0°$, $\beta2=60°$, and $\beta3=120°$ are established, the transmittance c based on polarization between the first optical region S1, the second optical region S2, and the third optical region S3 and each of the pixels P1 to P9 is calculated as follows: c=1 for the first pixel P1; c=0.25 for the second pixel P2; c=0.25 for the third pixel P3; c=1 for the fourth pixel P4; c=0.25 for the fifth pixel P5; c=0.25 for the sixth pixel P6; c=1 for the seventh pixel P7; c=0.25 for the eighth pixel P8; and c=0.25 for the ninth pixel P9. Further, the transmittance c based on polarization between the fourth optical region S4, the fifth optical region S5, and the sixth optical region S6 and each of the pixels P1 to P9 is calculated as follows: c=0.25 for the first pixel P1; c=1 for the second pixel P2; c=0.25 for the third pixel P3; c=0.25 for the fourth pixel P4; c=1 for the fifth pixel P5; c=0.25 for the sixth pixel P6; c=0.25 for the seventh pixel P7; c=1 for the eighth pixel P8; and c=0.25 for the ninth pixel P9. Furthermore, the transmittance c based on polarization between the seventh optical region S7, the eighth optical region S8, and the ninth optical region S9 and each of the pixels P1 to P9 is calculated as follows: c=0.25 for the first pixel P1; c=0.25 for the second pixel P2; c=1 for the third pixel P3; c=0.25 for the fourth pixel P4; c=0.25 for the fifth pixel P5; c=1 for the sixth pixel P6; c=0.25 for the seventh pixel P7; c=0.25 for the eighth pixel P8; and c=1 for the ninth pixel P9.

The transmittance c based on polarization between the j-th optical region Sj and the i-th pixel Pi can be represented by a matrix C of nine rows and nine columns having cij (i=1 to 9, j=1 to 9) as elements.

$$C = \begin{bmatrix} c11 & c12 & c13 & c14 & c15 & c16 & c17 & c18 & c19 \\ c21 & c22 & c23 & c24 & c25 & c26 & c27 & c28 & c29 \\ c31 & c32 & c33 & c34 & c35 & c36 & c37 & c38 & c39 \\ c41 & c42 & c43 & c44 & c45 & c46 & c47 & c48 & c49 \\ c51 & c52 & c53 & c54 & c55 & c56 & c57 & c58 & c59 \\ c61 & c62 & c63 & c64 & c65 & c66 & c67 & c68 & c69 \\ c71 & c72 & c73 & c74 & c75 & c76 & c77 & c78 & c79 \\ c81 & c82 & c83 & c84 & c85 & c86 & c87 & c88 & c89 \\ c91 & c92 & c93 & c94 & c95 & c96 & c97 & c98 & c99 \end{bmatrix}$$

In the imaging device 1 according to this embodiment, since $\alpha1=0°$, $\alpha2=60°$, $\alpha3=120°$, $\beta1=0°$, $\beta2=60°$, and $\beta3=120°$ are established, the matrix C is as follows.

$$C = \begin{bmatrix} 1.00 & 0.25 & 0.25 & 1.00 & 0.25 & 0.25 & 1.00 & 0.25 & 0.25 \\ 0.25 & 1.00 & 0.25 & 0.25 & 1.00 & 0.25 & 0.25 & 1.00 & 0.25 \\ 0.25 & 0.25 & 1.00 & 0.25 & 0.25 & 1.00 & 0.25 & 0.25 & 1.00 \\ 1.00 & 0.25 & 0.25 & 1.00 & 0.25 & 0.25 & 1.00 & 0.25 & 0.25 \\ 0.25 & 1.00 & 0.25 & 0.25 & 1.00 & 0.25 & 0.25 & 1.00 & 0.25 \\ 0.25 & 0.25 & 1.00 & 0.25 & 0.25 & 1.00 & 0.25 & 0.25 & 1.00 \\ 1.00 & 0.25 & 0.25 & 1.00 & 0.25 & 0.25 & 1.00 & 0.25 & 0.25 \\ 0.25 & 1.00 & 0.25 & 0.25 & 1.00 & 0.25 & 0.25 & 1.00 & 0.25 \\ 0.25 & 0.25 & 1.00 & 0.25 & 0.25 & 1.00 & 0.25 & 0.25 & 1.00 \end{bmatrix}$$

On the other hand, the transmittance d based on spectral transmittance is represented by the following a matrix D of nine rows and nine columns having dij (i=1 to 9, j=1 to 9) as elements.

$$D = \begin{bmatrix} d11 & d12 & d13 & d14 & d15 & d16 & d17 & d18 & d19 \\ d21 & d22 & d23 & d24 & d25 & d26 & d27 & d28 & d29 \\ d31 & d32 & d33 & d34 & d35 & d36 & d37 & d38 & d39 \\ d41 & d42 & d43 & d44 & d45 & d46 & d47 & d48 & d49 \\ d51 & d52 & d53 & d54 & d51 & d56 & d57 & d58 & d59 \\ d61 & d62 & d63 & d64 & d65 & d66 & d67 & d68 & d69 \\ d71 & d72 & d73 & d74 & d75 & d76 & d77 & d78 & d79 \\ d81 & d82 & d83 & d84 & d85 & d86 & d87 & d88 & d89 \\ d91 & d92 & d93 & d94 & d95 & d96 & d97 & d98 & d99 \end{bmatrix}$$

Here, dij is the transmittance between the j-th optical region Sj and the i-th pixel Pi. This transmittance is calculated from the wavelength band (the center wavelength or the peak wavelength) of the light transmitted through the j-th optical region Sj on the basis of the spectral transmittance of the spectral filter element 132A, 132B, or 132C comprised in the i-th pixel Pi.

Figure 15:
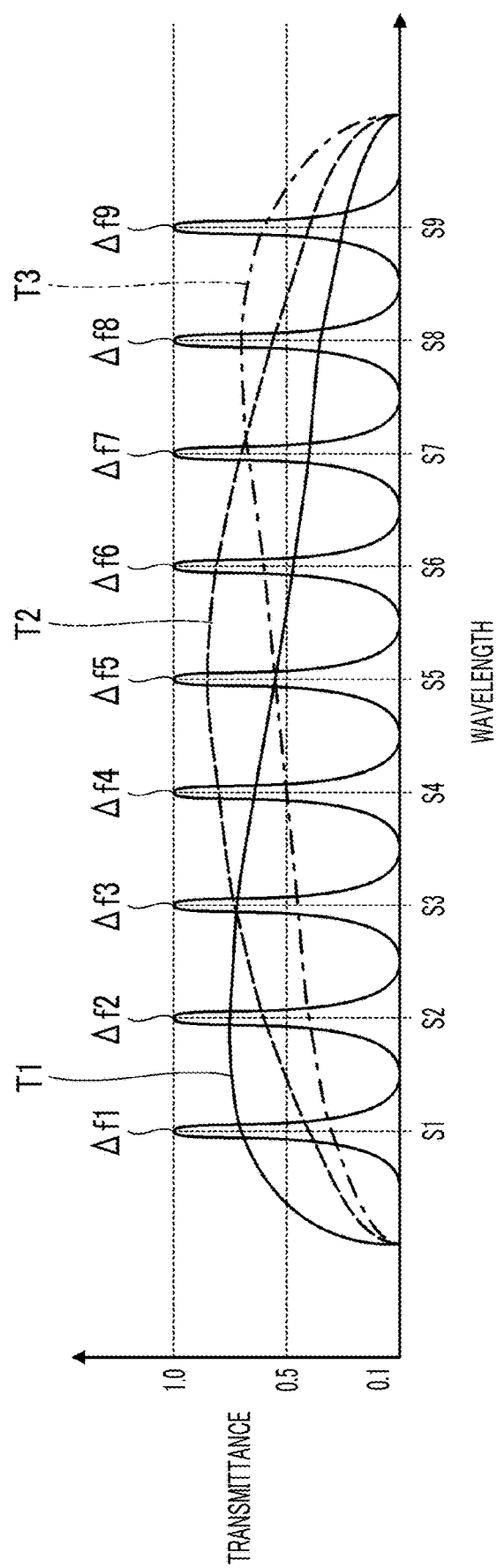
FIG. 15 is a graph illustrating an example of the relationship between the spectral transmittance of the spectral filter element comprised in each pixel and the wavelength band of light transmitted through each optical region of the optical system.

FIG. 15 is a graph illustrating an example of the relationship between the spectral transmittance of the spectral filter element comprised in each pixel and the wavelength band of the light transmitted through each optical region of the optical system.

As described above, in the imaging device 1 according to this embodiment, the first spectral filter elements 132A are comprised in the first pixel P1, the second pixel P2, and the third pixel P3. Therefore, the first pixel P1, the second pixel P2, and the third pixel P3 have the same spectral transmittance (a solid line graph T1 in FIG. 15). Further, in the imaging device 1 according to this embodiment, the second spectral filter elements 132B are comprised in the fourth pixel P4, the fifth pixel P5, and the sixth pixel P6. The fourth pixel P4, the fifth pixel P5, and the sixth pixel P6 have the same spectral transmittance (a dashed line graph T2 in FIG. 15). Furthermore, in the imaging device 1 according to this embodiment, the third spectral filter elements 132C are comprised in the seventh pixel P7, the eighth pixel P8, and the ninth pixel P9. Therefore, the seventh pixel P7, the eighth pixel P8, and the ninth pixel P9 have the same spectral transmittance (a one-dot chain line graph T3 in FIG. 15).

From the graphs illustrated in FIG. 15, the transmittance based on spectral transmittance between the first optical region S1 and each of the pixels P1 to P9 is calculated as follows: d11=0.7 for the first pixel P1; d21=0.7 for the second pixel P2; d31=0.7 for the third pixel P3; d41=0.4 for the fourth pixel P4; d51=0.4 for the fifth pixel P5; d61=0.4 for the sixth pixel P6; d71=0.3 for the seventh pixel P7; d81=0.3 for the eighth pixel P8; and d91=0.3 for the ninth pixel P9.

Further, the transmittance based on spectral transmittance between the second optical region S2 and each of the pixels P1 to P9 is calculated as follows: d12=0.75 for the first pixel P1; d22=0.75 for the second pixel P2; d32=0.75 for the third pixel P3; d42=0.6 for the fourth pixel P4; d52=0.6 for the fifth pixel P5; d62=0.6 for the sixth pixel P6; d72=0.4 for the seventh pixel P7; d82=0.4 for the eighth pixel P8; and d92=0.4 for the ninth pixel P9.

In addition, the transmittance based on spectral transmittance between the third optical region S3 and each of the pixels P1 to P9 is calculated as follows: d13=0.72 for the first pixel P1; d23=0.72 for the second pixel P2; d33=0.72 for the third pixel P3; d43=0.73 for the fourth pixel P4; d53=0.73 for the fifth pixel P5; d63=0.73 for the sixth pixel P6; d73=0.45 for the seventh pixel P7; d83=0.45 for the eighth pixel P8; and d93=0.45 for the ninth pixel P9.

Furthermore, the transmittance based on spectral transmittance between the fourth optical region S4 and each of the pixels P1 to P9 is calculated as follows: d14=0.64 for the first pixel P1; d24=0.64 for the second pixel P2; d34=0.64 for the third pixel P3; d44=0.8 for the fourth pixel P4; d54=0.8 for the fifth pixel P5; d64=0.8 for the sixth pixel P6; d74=0.5 for the seventh the pixel P7; d84=0.5 for the eighth pixel P8; and d94=0.5 for the ninth pixel P9.

Moreover, the transmittance based on spectral transmittance between the fifth optical region S5 and each of the pixels P1 to P9 is calculated as follows: d15=0.55 for the first pixel P1; d25=0.55 for the second pixel P2; d35=0.55 for the third pixel P3; d45=0.85 for the fourth pixel P4; d55=0.85 for the fifth pixel P5; d65=0.85 for the sixth pixel P6; d75=0.55 for the seventh pixel P7; d85=0.55 for the eighth pixel P8; and d95=0.55 for the ninth pixel P9.

In addition, the transmittance based on spectral transmittance between the sixth optical region S6 and each of the pixels P1 to P9 is calculated as follows: d16=0.47 for the first pixel P1; d26=0.47 for the second pixel P2; d36=0.47 for the third pixel P3; d46=0.81 for the fourth pixel P4; d56=0.81 for the fifth pixel P5; d66=0.81 for the sixth pixel P6; d76=0.6 for the seventh pixel P7; d86=0.6 for the eighth pixel P8; and d96=0.6 for the ninth pixel P9.

Further, the transmittance based on spectral transmittance between the seventh optical region S7 and each of the pixels P1 to P9 is calculated as follows: d17=0.4 for the first pixel P1; d27=0.4 for the second pixel P2; d37=0.4 for the third pixel P3; d47=0.7 for the fourth pixel P4; d57=0.7 for the fifth pixel P5; d67=0.7 for the sixth pixel P6; d77=0.67 for the seventh pixel P7; d87=0.67 for the eighth pixel P8; and d97=0.67 for the ninth pixel P9.

Furthermore, the transmittance based on spectral transmittance between the eighth optical region S8 and each of the pixels P1 to P9 is calculated as follows: d18=0.35 for the first pixel P1; d28=0.35 for the second pixel P2; d38=0.35 for the third pixel P3; d48=0.56 for the fourth pixel P4; d58=0.56 for the fifth pixel P5; d68=0.56 for the sixth pixel P6; d78=0.7 for the seventh pixel P7; d88=0.7 for the eighth pixel P8; and d98=0.7 for the ninth pixel P9.

Moreover, the transmittance based on spectral transmittance between the ninth optical region S9 and each of the pixels P1 to P9 is calculated as follows: d19=0.25 for the first pixel P1; d29=0.25 for the second pixel P2; d39=0.25 for the third pixel P3; d49=0.4 for the fourth pixel P4; d59=0.4 for the fifth pixel P5; d69=0.4 for the sixth pixel P6; d79=0.6 for the seventh pixel P7; d89=0.6 for the eighth pixel P8; and d99=0.6 for the ninth pixel P9.

Therefore, in the imaging device 1 according to this embodiment, the matrix D is as follows.

$$D = \begin{bmatrix} 0.70 & 0.75 & 0.72 & 0.64 & 0.55 & 0.47 & 0.40 & 0.35 & 0.25 \\ 0.70 & 0.75 & 0.72 & 0.64 & 0.55 & 0.47 & 0.40 & 0.35 & 0.25 \\ 0.70 & 0.75 & 0.72 & 0.64 & 0.55 & 0.47 & 0.40 & 0.35 & 0.25 \\ 0.40 & 0.60 & 0.73 & 0.80 & 0.85 & 0.81 & 0.70 & 0.56 & 0.40 \\ 0.40 & 0.60 & 0.73 & 0.80 & 0.85 & 0.81 & 0.70 & 0.56 & 0.40 \\ 0.40 & 0.60 & 0.73 & 0.80 & 0.85 & 0.81 & 0.70 & 0.56 & 0.40 \\ 0.30 & 0.40 & 0.45 & 0.50 & 0.55 & 0.60 & 0.67 & 0.70 & 0.60 \\ 0.30 & 0.40 & 0.45 & 0.50 & 0.55 & 0.60 & 0.67 & 0.70 & 0.60 \\ 0.30 & 0.40 & 0.45 & 0.50 & 0.55 & 0.60 & 0.67 & 0.70 & 0.60 \end{bmatrix}$$

As described above, the ratio $b_{ij}$ at which the light incident on the j-th optical region Sj of the optical system 10 is received by the i-th pixel Pi of each pixel block PB(x, y) is calculated by the product ($b_{ij}=c_{ij}*d_{ij}$) of the transmittance $c_{ij}$ based on polarization and the transmittance $d_{ij}$ based on spectral transmittance. Therefore, the matrix B having $b_{ij}$ as elements is represented by the Hadamard product of the matrix C and the matrix D.

$$B = C \odot D$$

$$\begin{bmatrix} b11 & b12 & b13 & b14 & b15 & b16 & b17 & b18 & b19 \\ b21 & b22 & b23 & b24 & b25 & b26 & b27 & b28 & b29 \\ b31 & b32 & b33 & b34 & b35 & b36 & b37 & b38 & b39 \\ b41 & b42 & b43 & b44 & b45 & b46 & b47 & ba4 & b49 \\ b51 & b52 & b53 & b54 & b51 & b56 & b57 & b58 & b59 \\ b61 & b62 & b63 & b64 & b65 & b66 & b67 & b68 & b69 \\ b71 & b72 & b73 & b74 & b75 & b76 & b77 & b78 & b79 \\ b81 & b82 & b83 & b84 & b85 & b86 & b87 & b88 & b89 \\ b91 & b92 & b93 & b94 & b95 & b96 & b97 & b98 & b99 \end{bmatrix} =$$

$$\begin{bmatrix} c11 & c12 & c13 & c14 & c15 & c16 & c17 & c18 & c19 \\ c21 & c22 & c23 & c24 & c25 & c26 & c27 & c28 & c29 \\ c31 & c32 & c33 & c34 & c35 & c36 & c37 & c38 & c39 \\ c41 & c42 & c43 & c44 & c45 & c46 & c47 & c48 & c49 \\ c51 & c52 & c53 & c54 & c51 & c56 & c57 & c58 & c59 \\ c61 & c62 & c63 & c64 & c65 & c66 & c67 & c68 & c69 \\ c71 & c72 & c73 & c74 & c75 & c76 & c77 & c78 & c79 \\ c81 & c82 & c83 & c84 & c85 & c86 & c87 & c88 & c89 \\ c91 & c92 & c93 & c94 & c95 & c96 & c97 & c98 & c99 \end{bmatrix} \circ$$

$$\begin{bmatrix} d11 & d12 & d13 & d14 & d15 & d16 & d17 & d18 & d19 \\ d21 & d22 & d23 & d24 & d25 & d26 & d27 & d28 & d29 \\ d31 & d32 & d33 & d34 & d35 & d36 & d37 & d38 & d39 \\ d41 & d42 & d43 & d44 & d45 & d46 & d47 & d48 & d49 \\ d51 & d52 & d53 & d54 & d51 & d56 & d57 & d58 & d59 \\ d61 & d62 & d63 & d64 & d65 & d66 & d67 & d68 & d69 \\ d71 & d72 & d73 & d74 & d75 & d76 & d77 & d78 & d79 \\ d81 & d82 & d83 & d84 & d85 & d86 & d87 & d88 & d89 \\ d91 & d92 & d93 & d94 & d95 & d96 & d97 & d98 & d99 \end{bmatrix}$$

$$\begin{bmatrix} b11 & b12 & b13 & b14 & b15 & b16 & b17 & b18 & b19 \\ b21 & b22 & b23 & b24 & b25 & b26 & b27 & b28 & b29 \\ b31 & b32 & b33 & b34 & b35 & b36 & b37 & b38 & b39 \\ b41 & b42 & b43 & b44 & b45 & b46 & b47 & ba4 & b49 \\ b51 & b52 & b53 & b54 & b51 & b56 & b57 & b58 & b59 \\ b61 & b62 & b63 & b64 & b65 & b66 & b67 & b68 & b69 \\ b71 & b72 & b73 & b74 & b75 & b76 & b77 & b78 & b79 \\ b81 & b82 & b83 & b84 & b85 & b86 & b87 & b88 & b89 \\ b91 & b92 & b93 & b94 & b95 & b96 & b97 & b98 & b99 \end{bmatrix} =$$

$$\begin{bmatrix} c11*d11 & c12*d12 & c13*d13 & c14*d14 & c15*d15 & c16*d16 & c17*d17 & c18*d18 & c19*d19 \\ c21*d21 & c22*d22 & c23*d23 & c24*d24 & c25*d25 & c26*d26 & c27*d27 & c28*d28 & c29*d29 \\ c31*d31 & c32*d32 & c33*d33 & c34*c34 & c35*d35 & c36*d36 & c37*d37 & c38*d38 & c39*d39 \\ c41*d41 & c42*d42 & c43*d43 & c44*d44 & c45*d45 & c46*d46 & c47*d47 & c48*d48 & c49*d49 \\ c51*d51 & c52*d52 & c53*d53 & c54*d54 & c51*d51 & c56*d56 & c57*d57 & c58*d58 & c59*d59 \\ c61*d61 & c62*d62 & c63*d63 & c64*d64 & c65*d65 & c66*d66 & c67*d67 & c68*d68 & c69*d69 \\ c71*d71 & c72*d72 & c73*d73 & c74*d74 & c75*d75 & c76*d76 & c77*d77 & c78*d78 & c79*d79 \\ c81*d81 & c82*d82 & c83*d83 & c84*d84 & c85*d85 & c86*d86 & c87*d87 & c88*d88 & c89*d89 \\ c91*d91 & c92*d92 & c93*d93 & c94*d94 & c95*d95 & c96*d96 & c97*d97 & c98*d98 & c99*d99 \end{bmatrix}$$

25

In the imaging device 1 according to this embodiment, each element bij of the matrix B is calculated as follows.

$$B = C \circ D = \begin{bmatrix} 0.7000 & 0.1875 & 0.1800 & 0.6400 & 0.1375 & 0.1175 & 0.4000 & 0.0875 & 0.0625 \\ 0.1750 & 0.7500 & 0.1800 & 0.1600 & 0.5500 & 0.1175 & 0.1000 & 0.3500 & 0.0625 \\ 0.1750 & 0.1850 & 0.7200 & 0.1600 & 0.1375 & 0.4700 & 0.1000 & 0.0875 & 0.2500 \\ 0.4000 & 0.1500 & 0.1825 & 0.8000 & 0.2125 & 0.2025 & 0.7000 & 0.14000 & 0.1000 \\ 0.1000 & 0.6000 & 0.1825 & 0.2000 & 0.8500 & 0.2025 & 0.1750 & 0.5600 & 0.2500 \\ 0.1000 & 0.1500 & 0.7300 & 0.2000 & 0.2125 & 0.8100 & 0.1750 & 0.1400 & 0.1000 \\ 0.3000 & 0.1000 & 0.1125 & 0.5000 & 0.1375 & 0.1500 & 0.6700 & 0.1750 & 0.1500 \\ 0.0750 & 0.4000 & 0.1125 & 0.1250 & 0.5500 & 0.1500 & 0.1675 & 0.7000 & 0.1500 \\ 0.0750 & 0.1000 & 0.4500 & 0.1250 & 0.1375 & 0.6000 & 0.1675 & 0.1750 & 0.6000 \end{bmatrix}$$

The inverse matrix $B^{-1}$ of the matrix B exists. That is, the inverse matrix of the matrix B exists since the matrix B does not have rows and columns which are the sequences of the same elements (the matrix C has columns which are the sequences of the same elements (for example, the first, fourth, and sixth columns are the sequences of the same elements, the second, fifth, and seventh columns are the sequences of the same elements, and the third, sixth and ninth columns are the sequences of the same elements). The matrix D has rows which are the sequences of the same elements (for example, the first to third rows are the sequences of the same elements, the fourth to sixth rows are the sequences of the same elements, and the seventh to ninth rows are the sequences of the same elements). However, the matrix B calculated by the Hadamard product of the matrix C and the matrix D does not have rows and columns which are the sequences of the same elements. Therefore, the inverse matrix $B^{-1}$ of the matrix B exists).

The inverse matrix $B^{-1}$ of the matrix B is as follows.

$$B^{-1} = \begin{bmatrix} 2.6812 & -0.5362 & -0.5362 & -3.2982 & 0.6596 & 0.6596 & 1.8451 & -0.3690 & -0.3690 \\ -0.6135 & 3.0677 & -0.6135 & 0.4115 & -2.0575 & 0.4115 & -0.0224 & 0.1122 & -0.0224 \\ -0.7364 & -0.7364 & 3.6820 & 0.3951 & 0.3951 & -1.9757 & 0.0434 & 0.0434 & -0.2170 \\ 0.8361 & 0.1672 & 0.1672 & 5.0308 & -1.0062 & -1.0062 & -4.7570 & 0.9514 & 0.9514 \\ 0.4190 & -2.0950 & 0.4190 & -0.8230 & 4.1152 & -0.8230 & 0.4489 & -2.2447 & 0.4489 \\ 0.7723 & 0.7723 & -3.8616 & -0.9564 & -0.9564 & 4.7821 & 0.3158 & 0.3158 & -1.5791 \\ -0.5766 & 0.1153 & 0.1153 & -2.2276 & 0.4555 & 0.4555 & 4.3822 & -0.8764 & -0.8764 \\ 0.0214 & -0.2069 & 0.0214 & 0.4115 & -2.0576 & 0.4115 & -0.6574 & 3.2868 & -0.6574 \\ -0.2200 & -0.2200 & 1.1001 & 0.6601 & 0.6601 & -3.3003 & -0.7187 & -0.7187 & 3.5937 \end{bmatrix} = A$$

Therefore, in the imaging device 1 according to this embodiment, an arithmetic expression for calculating the pixel signals X1 to X9 respectively correspond to the optical regions S1 to S9 from the pixel signals x1 to x9 of the pixels P1 to P9 is the following Expression 13.

$$\begin{bmatrix} X1 \\ X2 \\ X3 \\ X4 \\ X5 \\ X6 \\ X7 \\ X8 \\ X9 \end{bmatrix} = \begin{bmatrix} 2.6812 & -0.5362 & -0.5362 & -3.2982 & 0.6596 & 0.6596 & 1.8451 & -0.3690 & -0.3690 \\ -0.6135 & 3.0677 & -0.6135 & 0.4115 & -2.0575 & 0.4115 & -0.0224 & 0.1122 & -0.0224 \\ -0.7364 & -0.7364 & 3.6820 & 0.3951 & 0.3951 & -1.9757 & 0.0434 & 0.0434 & -0.2170 \\ -0.8361 & 0.1672 & 0.1672 & 5.0308 & -1.0062 & -1.0062 & -4.7570 & 0.9514 & 0.9514 \\ 0.4190 & -2.0950 & 0.4190 & -0.8230 & 4.1152 & -0.8230 & 0.4489 & -2.2447 & 0.4489 \\ 0.7723 & 0.7723 & -3.8616 & -0.9564 & -0.9564 & 4.7821 & 0.3158 & 0.3158 & -1.5791 \\ -0.5766 & 0.1153 & 0.1153 & -2.2276 & 0.4555 & 0.4555 & 4.3822 & -08764 & -0.8764 \\ 0.0214 & -0.2069 & 0.0214 & 0.4115 & -2.0576 & 0.4115 & -0.6574 & 3.2868 & -0.6574 \\ -0.2200 & -0.2200 & 1.1001 & 0.6601 & 0.6601 & -3.3003 & -0.7187 & -0.7187 & 3.5937 \end{bmatrix} * \begin{bmatrix} x1 \\ x2 \\ x3 \\ x4 \\ x5 \\ x6 \\ x7 \\ x8 \\ x9 \end{bmatrix} \quad \text{Expression 13}$$

The coefficient storage unit 200C stores each element aij of the matrix A of nine rows and nine columns as a coefficient group. The coefficient storage unit 200C is an example of a storage unit.

The image generation unit 200B acquires the coefficient group from the coefficient storage unit 200C and calculates the pixel signals X1 to X9 respectively corresponding to the optical regions S1 to S9 of the optical system 10 from the pixel signals x1 to x9 obtained from the pixels P1 to P9 of each pixel block PB(x, y) using Expression 1 to generate the image data of each of the optical regions S1 to S9. The image generation unit 200B is an example of an arithmetic unit.

The image data of each of the optical regions S1 to S9 generated by the image generation unit 200B is output to the outside and is stored in a storage device as needed. In addition, the image data is displayed on a display (not illustrated) as needed.

[Operation]

Figure 16:
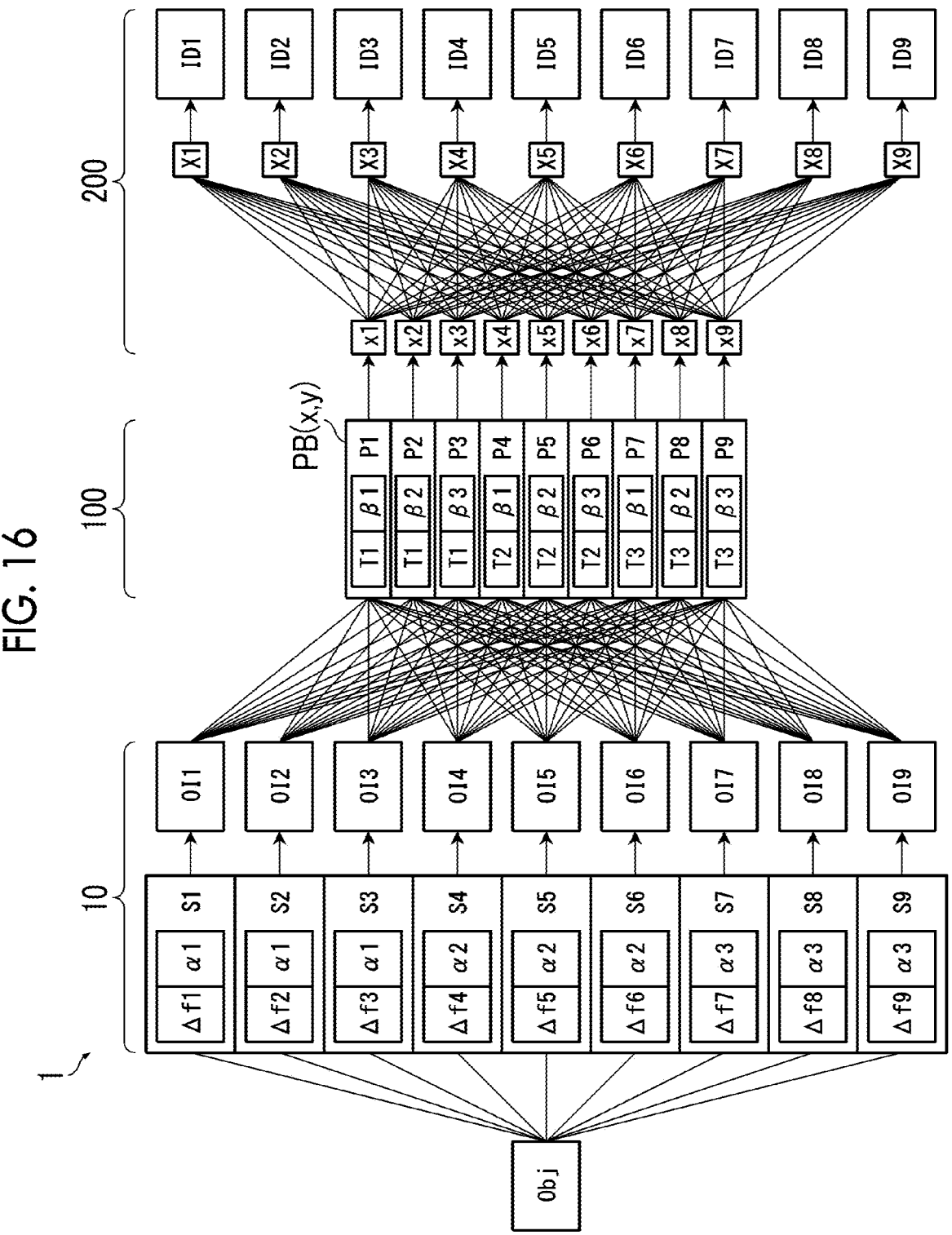
FIG. 16 is a conceptual diagram illustrating the operation of the imaging device according to this embodiment.

FIG. 16 is a conceptual diagram illustrating the operation of the imaging device according to this embodiment.

Light from an object Obj passes through each of the optical regions S1 to S9 of the optical system 10 and is received by each of the pixels P1 and P9 of the image sensor 100.

In this case, a first optical image OI1 of the object Obj is formed on the light receiving surface of the image sensor 100 by the light that has passed through the first optical region S1 of the optical system 10. The first optical image OI1 is an optical image formed by the light in the first wavelength band Δf1 linearly polarized in a predetermined polarization direction (azimuth angle α1).

In addition, a second optical image OI2 of the object Obj is formed on the light receiving surface of the image sensor 100 by the light that has passed through the second optical region S2 of the optical system 10. The second optical image OI2 is an optical image formed by the light in the second wavelength band Δf2 linearly polarized in a predetermined polarization direction (azimuth angle α1).

Further, a third optical image OI3 of the object Obj is formed on the light receiving surface of the image sensor 100 by the light that has passed through the third optical region S3 of the optical system 10. The third optical image OI3 is an optical image formed by the light in the third wavelength band Δf3 linearly polarized in a predetermined polarization direction (azimuth angle α1).

Furthermore, a fourth optical image OI4 of the object Obj is formed on the light receiving surface of the image sensor 100 by the light that has passed through the fourth optical region S4 of the optical system 10. The fourth optical image OI4 is an optical image formed by the light in the fourth wavelength band Δf4 linearly polarized in a predetermined polarization direction (azimuth angle α2).

In addition, a fifth optical image OI5 of the object Obj is formed on the light receiving surface of the image sensor 100 by the light that has passed through the fifth optical region S5 of the optical system 10. The fifth optical image OI5 is an optical image formed by the light in the fifth wavelength band Δf5 linearly polarized in a predetermined polarization direction (azimuth angle α2).

Further, a sixth optical image OI6 of the object Obj is formed on the light receiving surface of the image sensor 100 by the light that has passed through the sixth optical region S6 of the optical system 10. The sixth optical image OI6 is an optical image formed by the light in the sixth wavelength band Δf6 linearly polarized in a predetermined polarization direction (azimuth angle α2).

Furthermore, a seventh optical image OI7 of the object Obj is formed on the light receiving surface of the image sensor 100 by the light that has passed through the seventh optical region S7 of the optical system 10. The seventh optical image OI7 is an optical image formed by the light in the seventh wavelength band Δf7 linearly polarized in a predetermined polarization direction (azimuth angle α3).

Moreover, an eighth optical image OI8 of the object Obj is formed on the light receiving surface of the image sensor 100 by the light that has passed through the eighth optical region S8 of the optical system 10. The eighth optical image OI8 is an optical image formed by the light in the eighth wavelength band Δf8 linearly polarized in a predetermined polarization direction (azimuth angle α3).

In addition, a ninth optical image OI9 of the object Obj is formed on the light receiving surface of the image sensor 100 by the light that has passed through the ninth optical region S9 of the optical system 10. The ninth optical image OI9 is an optical image formed by the light in the ninth wavelength band Δf9 linearly polarized in a predetermined polarization direction (azimuth angle α3).

The image sensor 100 receives light from each of the optical regions S1 to S9 of the optical system 10 using each of the pixels P1 to P9 and outputs the signals (pixel signals) x1 to x9 corresponding to the amounts of light received to the signal processing unit 200.

In this case, the first pixel P1 receives light from each of the optical regions S1 to S9 with a predetermined transmittance through the first spectral filter element 132A (see the graph T1 in FIG. 15) having a predetermined spectral transmittance and receives light in a predetermined polarization direction (azimuth angle 131) through the first polarization filter element 122A. Then, the first pixel P1 outputs the pixel signal x1 corresponding to the amount of light received to the signal processing unit 200.

In addition, the second pixel P2 receives light from each of the optical regions S1 to S9 with a predetermined transmittance through the first spectral filter element 132A and receives light in a predetermined polarization direction (azimuth angle β2) through the second polarization filter element 122B. Then, the second pixel P2 outputs the pixel signal x2 corresponding to the amount of light received to the signal processing unit 200.

Further, the third pixel P3 receives light from each of the optical regions S1 to S9 with a predetermined transmittance through the first spectral filter element 132A and receives light in a predetermined polarization direction (azimuth angle β3) through the third polarization filter element 122C. Then, the third pixel P3 outputs the pixel signal x3 corresponding to the amount of light received to the signal processing unit 200.

Furthermore, the fourth pixel P4 receives light from each of the optical regions S1 to S9 with a predetermined transmittance through the second spectral filter element 132B (see the graph T2 in FIG. 15) having a predetermined spectral transmittance and receives light in a predetermined polarization direction (azimuth angle 131) through the first polarization filter element 122A. Then, the fourth pixel P4 outputs the pixel signal x4 corresponding to the amount of light received to the signal processing unit 200.

Moreover, the fifth pixel P5 receives light from each of the optical regions S1 to S9 with a predetermined transmittance through the second spectral filter element 132B and receives light in a predetermined polarization direction (azimuth angle β2) through the second polarization filter element 122B. Then, the fifth pixel P5 outputs the pixel signal x5 corresponding to the amount of light received to the signal processing unit 200.

In addition, the sixth pixel P6 receives light from each of the optical regions S1 to S9 with a predetermined transmittance through the second spectral filter element 132B and receives light in a predetermined polarization direction (azimuth angle β3) through the third polarization filter element 122C. Then, the sixth pixel P6 outputs the pixel signal x6 corresponding to the amount of light received to the signal processing unit 200.

Further, the seventh pixel P7 receives light from each of the optical regions S1 to S9 with a predetermined transmittance through the third spectral filter element 132C (see the graph T3 in FIG. 15) having a predetermined spectral transmittance and receives light in a predetermined polarization direction (azimuth angle 131) through the first polarization filter element 122A. Then, the seventh pixel P7 outputs the pixel signal x7 corresponding to the amount of light received to the signal processing unit 200.

Further, the eighth pixel P8 receives light from each of the optical regions S1 to S9 with a predetermined transmittance through the third spectral filter element 132C and receives light in a predetermined polarization direction (azimuth angle β2) through the second polarization filter element 122B. Then, the eighth pixel P8 outputs the pixel signal x8 corresponding to the amount of light received to the signal processing unit 200.

Furthermore, the ninth pixel P9 receives light from each of the optical regions S1 to S9 with a predetermined transmittance through the third spectral filter element 132C and receives light in a predetermined polarization direction (azimuth angle β3) through the third polarization filter element 122C. Then, the ninth pixel P9 outputs the pixel signal x9 corresponding to the amount of light received to the signal processing unit 200.

The signal processing unit 200 calculates the pixel signals X1 to X9 respectively corresponding to the optical regions S1 to S9 of the optical system 10 from the pixel signals x1 to x9 respectively obtained from the pixels P1 to P9 of each pixel block PB(x, y) of the image sensor 100 to generate the image data of images D1 to ID9 respectively obtained by the optical regions S1 to S9. That is, arithmetic processing is performed with Expression 1 using the matrix A to calculate the pixel signals X1 to X9 respectively corresponding to the optical regions S1 to S9 from the pixel signals x1 to x9 of the pixels P1 to P1 obtained from the image sensor 100, thereby generating the image data of the images ID1 to ID9 respectively obtained by the optical regions S1 to S9.

As such, according to the imaging device 1 of this embodiment, the images (multispectral image) of nine wavelength bands can be acquired by one optical system 10 and one image sensor 100. Further, since light can be incident on each pixel block PB(x, y) of the image sensor 100 from the optical system 10 under uniform conditions, it is possible to simply generate a high-quality image.

EXAMPLES

In the imaging device 1 according to the above-described embodiment in which the pupil portion is divided into nine regions, the spectral filter 16 and the polarization filter 18 comprised in the optical system 10, and the polarization filter elements 122A 122B, and 122C and the spectral filter elements 132A, 132B, and 132C comprised in the pixels P1 to P9 of the image sensor 100 are set as follows.

It is assumed that the transmission polarization direction α1 of the first polarization filter unit G1 of the polarization filter 18 comprised in the optical system 10 is 0°, the transmission polarization direction α2 of the second polarization filter unit G2 is 60°, and the transmission polarization direction α3 of the third polarization filter unit G3 is 120°. In this case, the polarization direction of the light transmitted through the first optical region S1, the second optical region S2, and the third optical region S3 is 0°, the polarization direction of the light transmitted through the fourth optical region S4, the fifth optical region S5, and the sixth optical region S6 is 60°, and the polarization direction of the light transmitted through the seventh optical region S7, the eighth optical region S8, and the ninth optical region S9 is 120°.

It is assumed that the transmission wavelength band of the first spectral filter unit F1 of the spectral filter 16 comprised in the optical system 10 is $\Delta f1$, the center wavelength thereof is 21, the transmission wavelength band of the second spectral filter unit F2 is $\Delta f2$, the center wavelength thereof is $\lambda 2$, the transmission wavelength band of the third spectral filter unit F3 is $\Delta f3$, the center wavelength thereof is $\lambda 3$, the transmission wavelength band of the fourth spectral filter unit F4 is $\Delta f4$, the center wavelength thereof is $\lambda 4$, the transmission wavelength band of the fifth spectral filter unit F5 is $\Delta f5$, the center wavelength thereof is $\lambda 5$, the transmission wavelength band of the sixth spectral filter unit F6 is $\Delta f6$, the center wavelength thereof is $\lambda 6$, the transmission wavelength band of the seventh spectral filter unit F7 is $\Delta f7$, the center wavelength thereof is $\lambda 7$, the transmission wavelength band of the eighth spectral filter unit F8 is $\Delta f8$, the center wavelength thereof is a, the transmission wavelength band of the ninth spectral filter unit F9 is $\Delta f9$, and the center wavelength thereof is $\lambda 9$. In this case, the wavelength band of the light transmitted through the first optical region S1 is $\Delta f1$ (center wavelength $\lambda 1$), the wavelength band of the light transmitted through the second optical region S2 is $\Delta f2$ (center wavelength $\lambda 2$), the wavelength band of the light transmitted through the third optical region S3 is $\Delta f3$ (center wavelength $\lambda 3$), the wavelength band of the light transmitted through the fourth optical region S4 is $\Delta f4$ (center wavelength $\lambda 4$), the wavelength band of the light transmitted through the fifth optical region S5 is $\Delta f5$ (center wavelength λ5), the wavelength band of the light transmitted through the sixth optical region S6 is Δf6 (center wavelength λ6), the wavelength band of the light transmitted through the seventh optical region S7 is Δf7 (center wavelength λ1), the wavelength band of the light transmitted through the eighth optical region S8 is Δf8 (center wavelength λ8), and the wavelength band of the light transmitted through the ninth optical region S9 is Δf9 (center wavelength λ9).

It is assumed that the transmission polarization direction β1 of the first polarization filter element 122A comprised in each pixel of the image sensor 100 is 0°, the transmission polarization direction P2 of the second polarization filter element 122B is 60°, and the transmission polarization direction P3 of the third polarization filter element 122C is 120°. In this case, the polarization direction of the light received by the first pixel P1 is 0°, the polarization direction of the light received by the second pixel P2 is 60°, the polarization direction of the light received by the third pixel P3 is 120°, the polarization direction of the light received by the fourth pixel P4 is 0°, the polarization direction of the light received by the fifth pixel P5 is 60°, the polarization direction of the light received by the sixth pixel P6 is 120°, the polarization direction of the light received by the seventh pixel P7 is 0°, the polarization direction of the light received by the eighth pixel P8 is 60°, and the polarization direction of the light received by the ninth pixel P9 is 120°.

Figure 17:
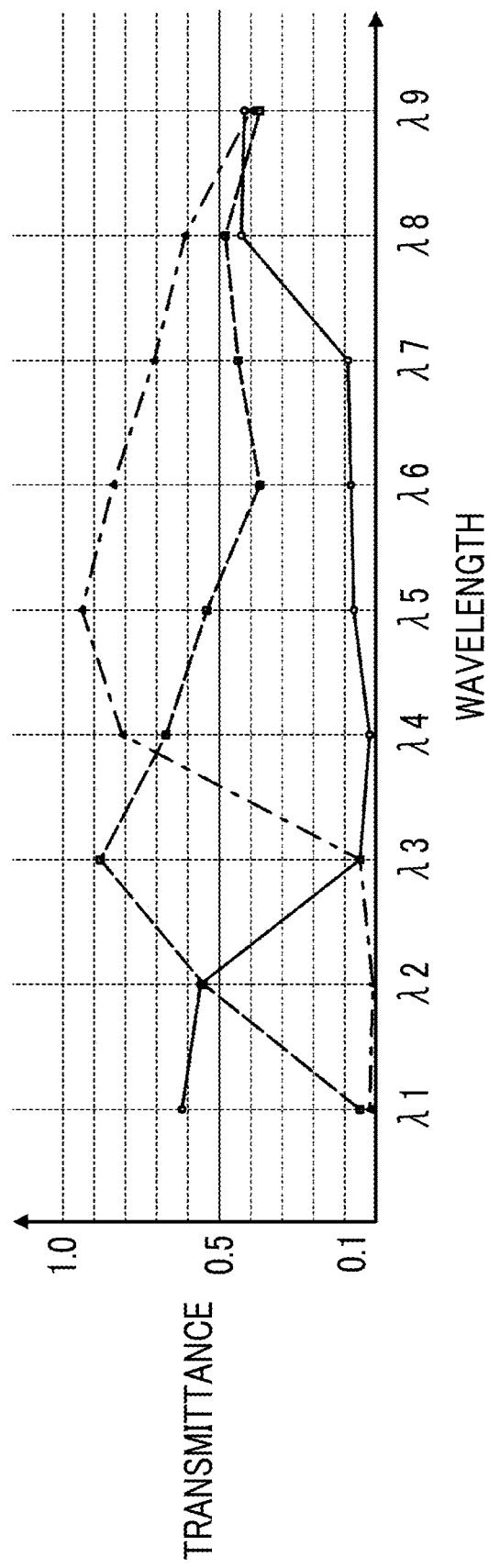
FIG. 17 is a graph illustrating the spectral transmittance of the spectral filter element comprised in each pixel of the image sensor.

FIG. 17 is a graph illustrating the spectral transmittance of the spectral filter element comprised in each pixel of the image sensor. In FIG. 17, a graph T1 represented by a solid line is a graph of the spectral transmittance of the first spectral filter element 132A. In addition, a graph T2 represented by a dashed line is a graph of the spectral transmittance of the second spectral filter element 132B. Further, a graph T3 represented by a one-dot chain line is a graph of the spectral transmittance of the third spectral filter element 132C.

In the optical system 10 and the image sensor 100 having the above-mentioned configurations, the transmittance c based on polarization between the j-th optical region Sj and the i-th pixel Pi is represented by the following matrix C of nine rows and nine columns having $c_{ij}$ (i=1 to 9, j=1 to 9) as elements.

$$C = \begin{bmatrix} 1.00 & 0.25 & 0.25 & 1.00 & 0.25 & 0.25 & 1.00 & 0.25 & 0.25 \\ 0.25 & 1.00 & 0.25 & 0.25 & 1.00 & 0.25 & 0.25 & 1.00 & 0.25 \\ 0.25 & 0.25 & 1.00 & 0.25 & 0.25 & 1.00 & 0.25 & 0.25 & 1.00 \\ 1.00 & 0.25 & 0.25 & 1.00 & 0.25 & 0.25 & 1.00 & 0.25 & 0.25 \\ 0.25 & 1.00 & 0.25 & 0.25 & 1.00 & 0.25 & 0.25 & 1.00 & 0.25 \\ 0.25 & 0.25 & 1.00 & 0.25 & 0.25 & 1.00 & 0.25 & 0.25 & 1.00 \\ 1.00 & 0.25 & 0.25 & 1.00 & 0.25 & 0.25 & 1.00 & 0.25 & 0.25 \\ 0.25 & 1.00 & 0.25 & 0.25 & 1.00 & 0.25 & 0.25 & 1.00 & 0.25 \\ 0.25 & 0.25 & 1.00 & 0.25 & 0.25 & 1.00 & 0.25 & 0.25 & 1.00 \end{bmatrix}$$

Further, the transmittance d based on spectral transmittance is represented by the following matrix D of nine rows and nine columns having $d_{ij}$ (i=1 to 9, j=1 to 9) as elements.

$$D = \begin{bmatrix} 0.62 & 0.56 & 0.05 & 0.02 & 0.07 & 0.08 & 0.09 & 0.44 & 0.42 \\ 0.62 & 0.56 & 0.05 & 0.02 & 0.07 & 0.08 & 0.09 & 0.44 & 0.42 \\ 0.62 & 0.56 & 0.05 & 0.02 & 0.07 & 0.08 & 0.09 & 0.44 & 0.42 \\ 0.05 & 0.55 & 0.88 & 0.67 & 0.17 & 0.37 & 0.44 & 0.48 & 0.37 \\ 0.05 & 0.55 & 0.88 & 0.67 & 0.17 & 0.37 & 0.44 & 0.48 & 0.37 \\ 0.05 & 0.55 & 0.88 & 0.67 & 0.17 & 0.37 & 0.44 & 0.48 & 0.37 \\ 0.02 & 0.01 & 0.05 & 0.81 & 0.94 & 0.84 & 0.71 & 0.61 & 0.40 \\ 0.02 & 0.01 & 0.05 & 0.81 & 0.94 & 0.84 & 0.71 & 0.61 & 0.40 \\ 0.02 & 0.01 & 0.05 & 0.81 & 0.94 & 0.84 & 0.71 & 0.61 & 0.40 \end{bmatrix}$$

The matrix B indicating the amount of crosstalk of light from each optical region Sj is calculated by the Hadamard product of the matrix C and the matrix D.

$$B = C \circ D = \begin{bmatrix} 0.6200 & 0.1400 & 0.0125 & 0.0200 & 0.0175 & 0.2000 & 0.0900 & 0.1100 & 0.1050 \\ 0.1550 & 0.5600 & 0.0125 & 0.0050 & 0.0700 & 0.0200 & 0.0225 & 0.4400 & 0.1050 \\ 0.1550 & 0.1400 & 0.0500 & 0.0050 & 0.0175 & 0.0800 & 0.0225 & 0.1100 & 0.4200 \\ 0.0500 & 0.1375 & 0.2200 & 0.6700 & 0.0425 & 0.0925 & 0.4400 & 0.1200 & 0.0925 \\ 0.0125 & 0.5600 & 0.2200 & 0.1675 & 0.1700 & 0.0925 & 0.1100 & 0.4800 & 0.0925 \\ 0.0125 & 0.1375 & 0.8800 & 0.1675 & 0.0425 & 0.3700 & 0.1100 & 0.1200 & 0.3700 \\ 0.2000 & 0.0025 & 0.0125 & 0.8100 & 0.2350 & 0.2100 & 0.7100 & 0.1525 & 0.1000 \\ 0.0050 & 0.0100 & 0.0125 & 0.2025 & 0.9400 & 0.2100 & 0.1775 & 0.6100 & 0.1000 \\ 0.0050 & 0.0025 & 0.0500 & 0.2025 & 0.2350 & 0.8400 & 0.1775 & 0.1525 & 0.4000 \end{bmatrix}$$

The matrix A of the arithmetic expression (Expression 1) for removing crosstalk is acquired by calculating the inverse matrix $B^{-1}$ of the matrix B.

$$B^{-1} = \begin{bmatrix} 1.7471 & -0.3494 & -0.3494 & 0.8596 & -0.1719 & -0.1719 & -0.7542 & 0.1508 & 0.1508 \\ 8.5965 & -42.9824 & 8.5965 & -9.1754 & 45.8768 & -9.1754 & 1.0192 & -5.0960 & 1.0192 \\ 0.1351 & 0.1351 & -0.6753 & -0.2661 & -0.2661 & 1.3306 & 0.1044 & 0.1044 & -0.5218 \\ -0.3910 & 0.0782 & 0.0782 & 6.4203 & -1.2841 & -1.2841 & -3.9292 & 0.7858 & 0.7858 \\ 8.1809 & -40.9044 & 8.1809 & -8.3417 & 41.7084 & -8.3417 & 0.6630 & -3.3149 & 0.6830 \\ 0.2767 & 0.2767 & -1.3833 & 0.0008 & 0.0008 & -0.0041 & -0.2913 & -0.2913 & 1.4563 \\ 0.3969 & -0.0794 & -0.0794 & -7.3487 & 1.4697 & 1.4697 & 6.0688 & -1.2138 & -1.2138 \\ -12.7475 & 63.7377 & -12.7475 & 13.0048 & -65.0241 & 13.0048 & -1.4028 & 7.0132 & -1.4026 \\ -0.5979 & -0.5979 & 2.9894 & 0.0315 & 0.0315 & -1.1578 & 0.0431 & 0.0431 & -0.2153 \end{bmatrix} = A$$

Therefore, in the imaging device according to this embodiment, an arithmetic expression for calculating the pixel signals X1 to X9 respectively corresponding to the optical regions S1 to S9 from the pixel signals x1 to x9 of the pixels P1 to P9 is the following Expression 14.

$$\begin{bmatrix} X1 \\ X2 \\ X3 \\ X4 \\ X5 \\ X6 \\ X7 \\ X8 \\ X9 \end{bmatrix} = \begin{bmatrix} 1.7471 & -0.3494 & -0.3494 & 0.8596 & -0.1719 & -0.1719 & -0.7542 & 0.1508 & 0.1508 \\ 8.5965 & -42.9824 & 8.5965 & -9.1754 & 45.8768 & -9.1754 & 1.0192 & -5.0960 & 1.0192 \\ 0.1351 & 0.1351 & -0.6753 & -0.2661 & -0.2661 & 1.3306 & 0.1044 & 0.1044 & -0.5218 \\ -0.3910 & 0.0782 & 0.0782 & 6.4203 & -1.2841 & -1.2841 & -3.9292 & 0.7858 & 0.7858 \\ 8.1809 & -40.9044 & 8.1809 & -8.3417 & 41.7084 & -8.3417 & 0.6630 & -3.3149 & 0.6830 \\ 0.2767 & 0.2767 & -1.3833 & 0.0008 & 0.0008 & -0.0041 & -0.2913 & -0.2913 & 1.4563 \\ 0.3969 & -0.0794 & -0.0794 & -7.3487 & 1.4697 & 1.4697 & 6.0688 & -1.2138 & -1.2138 \\ -12.7475 & 63.7377 & -12.7475 & 13.0048 & -65.0241 & 13.0048 & -1.4028 & 7.0132 & -1.4026 \\ -0.5979 & -0.5979 & 2.9894 & 0.0315 & 0.0315 & -1.1578 & 0.0431 & 0.0431 & -0.2153 \end{bmatrix} * \begin{bmatrix} x1 \\ x2 \\ x3 \\ x4 \\ x5 \\ x6 \\ x7 \\ x8 \\ x9 \end{bmatrix} \quad \text{Expression 14}$$

Figure 18:
FIG. 18 is a diagram illustrating an example of object images.

FIG. 18 is a diagram illustrating an example of an object image.

Here, a case in which the image illustrated in FIG. 18 is captured by the imaging device having the above-mentioned configuration is considered.

Figure 19:
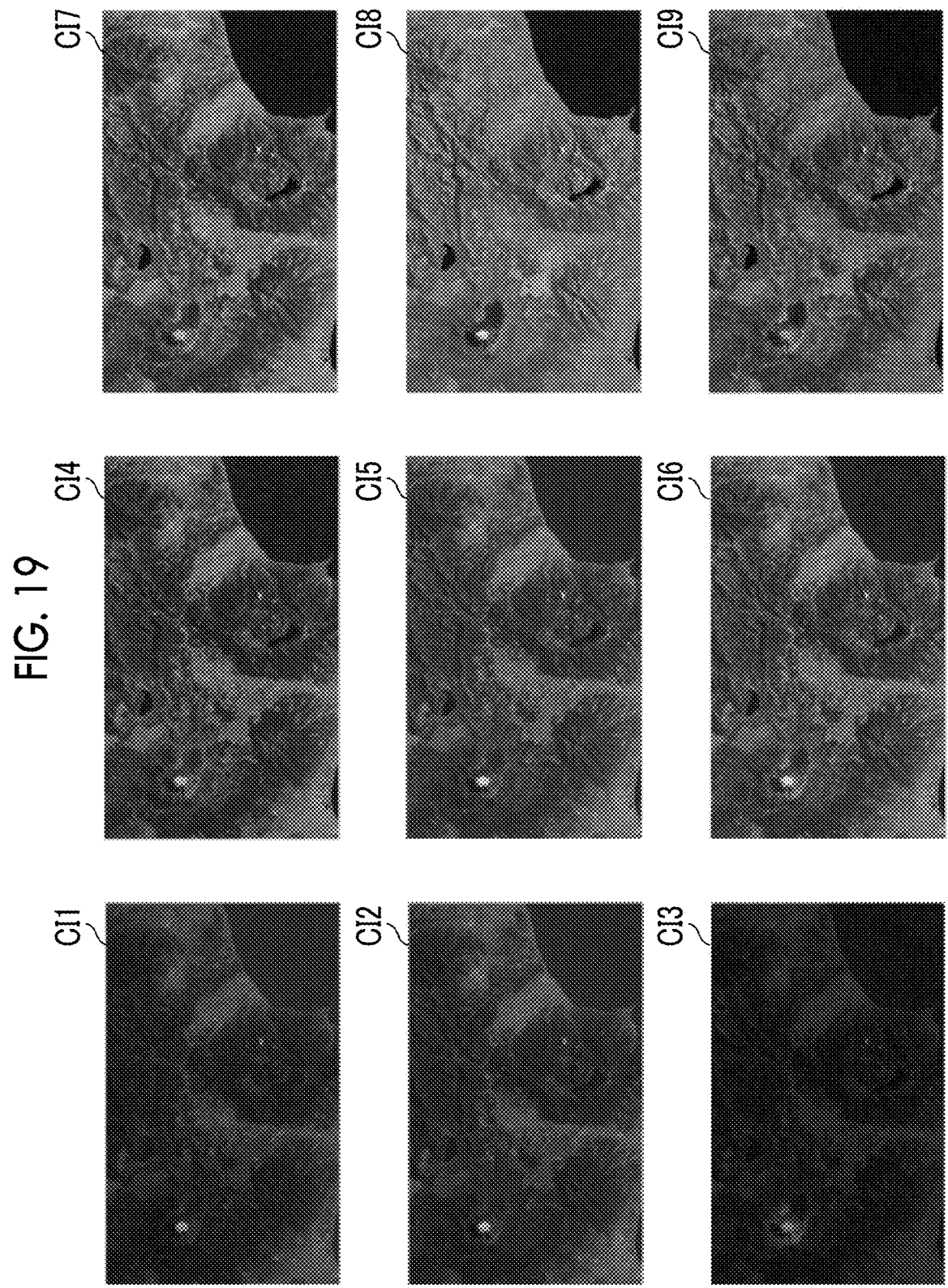
FIG. 19 is a diagram illustrating an example of images generated by pixel signals x1 to x9 output from the image sensor.

FIG. 19 is a diagram illustrating an example of the images generated by the pixel signals x1 to x9 output from the image sensor.

In FIG. 19, reference numeral CH indicates the image generated by the pixel signal x1 from the first pixel P1 of each pixel block PB(x, y). In addition, reference numeral CI2 indicates the image generated by the pixel signal x2 from the second pixel P2 of each pixel block PB(x, y). Further, reference numeral CI3 indicates the image generated by the pixel signal x3 from the third pixel P3 of each pixel block PB(x, y). Furthermore, reference numeral CI4 indicates the image generated by the pixel signal x4 from the fourth pixel P4 of each pixel block PB(x, y). Moreover, reference numeral CI5 indicates the image generated by the pixel signal x5 from the fifth pixel P5 of each pixel block PB(x, y). In addition, reference numeral CI6 indicates the image generated by the pixel signal x6 from the sixth pixel P6 of each pixel block PB(x, y). Further, reference numeral CI7 indicates the image generated by the pixel signal x7 from the seventh pixel P7 of each pixel block PB(x, y). Furthermore, reference numeral CI8 indicates the image generated by the pixel signal x8 from the eighth pixel P8 of each pixel block PB(x, y). Moreover, reference numeral CI9 indicates the image generated by the pixel signal x9 from the ninth pixel P9 of each pixel block PB(x, y). Crosstalk has occurred in these images CI1 to CI9.

Figure 20:
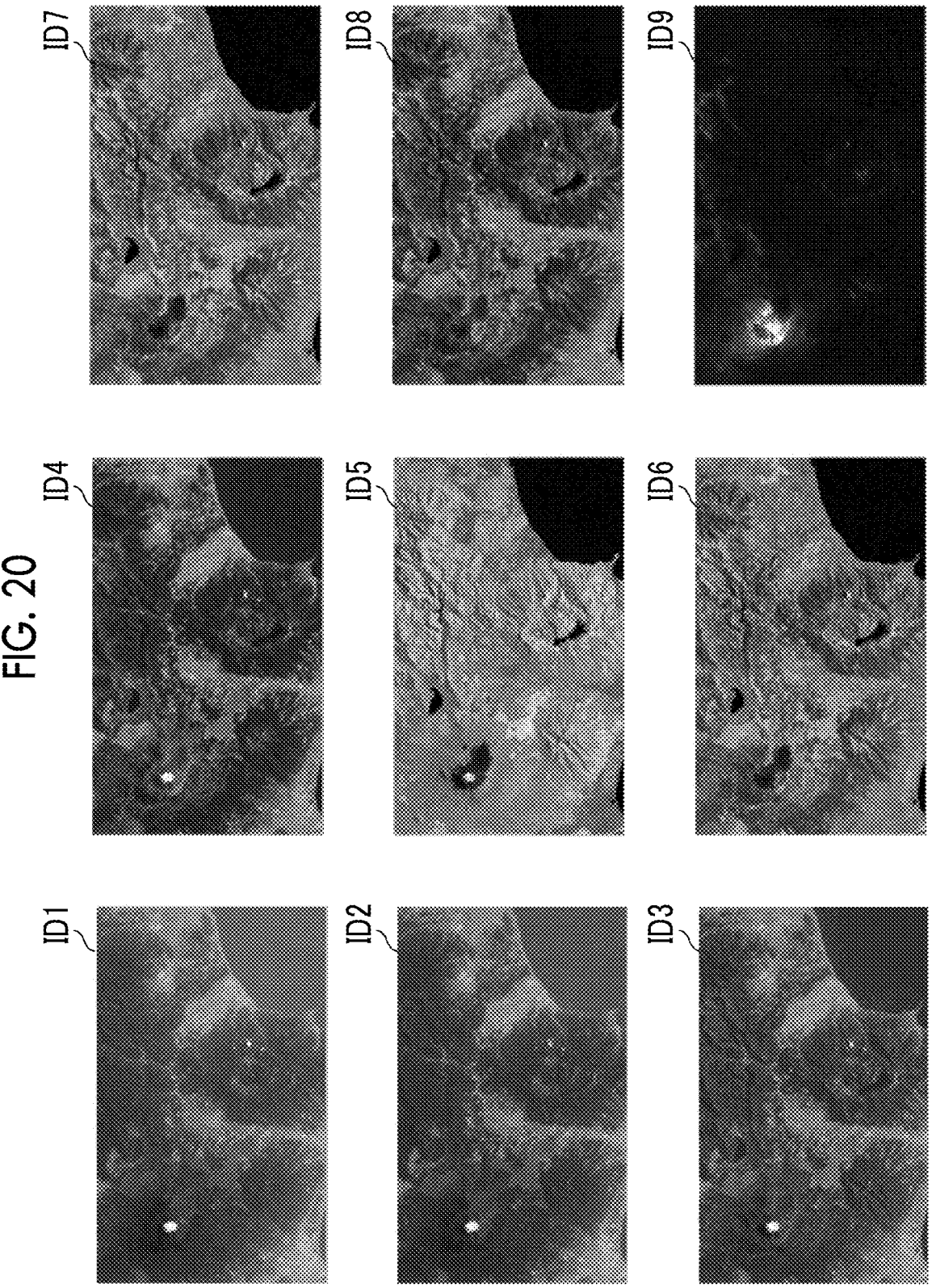
FIG. 20 is a diagram illustrating an example of images generated by performing a crosstalk removal process on the pixel signals x1 to x9 output from the image sensor.

FIG. 20 is a diagram illustrating an example of the images generated by performing a crosstalk removal process on the pixel signals x1 to x9 output from the image sensor.

Nine pixel signals X1 to X9 respectively corresponding to the optical regions S1 to S9 of the optical system 10 are calculated from nine pixel signals x1 to x9 obtained from each pixel block of the image sensor to generate the image data of the images ID1 to ID9 respectively obtained by the optical regions S1 to S9. That is, the pixel signals X1 to X9 respectively corresponding to the optical regions S1 to S9 are calculated from the pixel signals x1 to x9 of the pixels P1 to P9 by Expression 14 to generate the image data of the images ID1 to ID9 respectively obtained by the optical regions S1 to S9.

Further, in FIG. 20, reference numeral ID1 indicates the image obtained by the first optical region S1. In addition, reference numeral ID2 indicates the image obtained by the second optical region S2. Furthermore, reference numeral ID3 indicates the image obtained by the third optical region S3. Moreover, reference numeral ID4 indicates the image obtained by the fourth optical region S4. In addition, reference numeral ID5 indicates the image obtained by the fifth optical region S5. Further, reference numeral ID6 indicates the image obtained by the sixth optical region S6. Furthermore, reference numeral ID7 indicates the image obtained by the seventh optical region S7. Moreover, reference numeral ID8 indicates the image obtained by the eighth optical region S8. Further, reference numeral ID 9 indicates the image obtained by the ninth optical region S9. All of the images ID1 to ID9 are clear images from which crosstalk has been removed.

MODIFICATION EXAMPLES

[Number of Images Acquired]

In the above-described embodiment, the case in which nine images of different wavelength bands are acquired has been described as an example. However, the number of images acquired is not limited thereto. In the imaging device according to the invention, the number of images k that can be acquired is determined as follows.

Here, it is assumed that the type of the spectral filter element (first optical filter element) comprised in each pixel of the image sensor is an n type and the type of the polarization filter element (second optical filter element) is an m type (the type of the transmission polarization direction). n is an integer that is equal to or greater than 2 (n≥2), and m is an integer that is equal to or greater than 2 and equal to or less than 3 (2≤m≤3). In one pixel block, the pixels are configured by a combination of different spectral filter elements and polarization filter elements. Therefore, in this case, one pixel block is composed of (n×m) pixels. It is assumed that the product (n×m) of n and m is q (q=n×m). In the imaging device according to the invention, the number of images k that can be acquired is equal to or less than the number of pixels q constituting one pixel block (k≤q). Here, k is an integer that is equal to or greater than 3.

As such, the number of images k acquired is not necessarily equal to the number of pixels q constituting one pixel block. One pixel block may be composed of the number of pixels larger than the number of images acquired.

The optical system comprises the optical regions whose number is equal to the number of images k acquired. In addition, each optical region comprises the polarization filter unit. The polarization filter units of the optical system are set so as to satisfy the following conditions. That is, it is assumed that, for the transmission polarization direction of the polarization filter unit comprised in each optical region, the number of optical regions having the same transmission polarization direction is u. The number u is equal to or less than the number of types of spectral filter elements (first optical filter elements) in the image sensor. Therefore, in a case in which there are n types of spectral filter elements (first optical filter elements) in the image sensor, the number of optical regions u having the same transmission polarization direction is equal to or less than the number of types of spectral filter elements (first optical filter elements) n in the image sensor (u≤n).

In a case in which one pixel block is composed of q pixels by combining n types of spectral filter elements and m types of polarization filter elements, q pixel signals x1, x2, . . . , xq are acquired from each pixel block of the image sensor. In a case in which the optical system has k optical regions, an arithmetic expression for calculating k pixel signals X1, X2, . . . , Xk corresponding to each optical region of the optical system from the q pixel signals x1, x2, . . . , xq is defined using the matrix A as follows.

$$A = \begin{Bmatrix} a11 & a12 & \cdots & a1q \\ a21 & a22 & \cdots & a2q \\ \vdots & \vdots & \vdots & \vdots \\ ak1 & ak2 & \cdots & akq \end{Bmatrix}$$

$$\begin{bmatrix} X1 \\ X2 \\ \vdots \\ Xk \end{bmatrix} = \begin{bmatrix} a11 & a12 & \cdots & a1q \\ a21 & a22 & \cdots & a2q \\ \vdots & \vdots & \vdots & \vdots \\ ak1 & ak2 & \cdots & akq \end{bmatrix} * \begin{bmatrix} x1 \\ x2 \\ \vdots \\ xq \end{bmatrix}$$

As described above, the matrix A is acquired by calculating the inverse matrix $B^{-1}$ of the matrix B which has, as an element, the ratio at which the light incident on each optical region of the optical system is received by each pixel of each pixel block of the image sensor. In addition, the ratio is calculated by the product of the transmittance c based on polarization and the transmittance d based on spectral transmittance.

[Setting of Transmission Polarization Directions of Polarization Filter Unit and Polarization Filter Element]

In the above-described embodiment, a combination of the transmission polarization directions of the polarization filter units comprised in each optical region of the optical system is the same as a combination of the transmission polarization directions of the polarization filter elements (second optical filter elements) comprised in the image sensor (they are all a combination of azimuthal angles of 0°, 60°, and 120°). However, the combinations are not necessarily the same. For example, a combination of 45°, 90°, and 135° may be used in the optical system, and a combination of 0°, 60°, and 120° may be used in the image sensor. In addition, the use of the same combination makes it possible to easily calculate the transmittance c based on polarization.

[Transmission Wavelength Band Set in Each Optical Region]

Any transmission wavelength band can be set in each optical region of the optical system. For example, a specific wavelength band may be subdivided, and an image of each subdivided band may be acquired. In this case, it is possible to acquire a multispectral image of a specific wavelength band.

In a case in which an image of a subdivided narrow band is acquired, a narrow-band filter that transmits light in a desired wavelength band is disposed in each optical region.

[Aspects of Pupil Division]

In the above-described embodiment, the pupil portion of the optical system is equally divided into a plurality of optical regions in the circumferential direction. However, the aspect of the pupil division is not limited thereto. In addition, for example, the following aspects can be used: an aspect in which the pupil portion is divided into concentric circles; an aspect in which the pupil portion is divided into grids; and an aspect in which the pupil portion is divided into slits.

[Configuration of Image Sensor]

The arrangement of the pixels constituting one pixel block is not limited to the arrangement according to the above-described embodiment. The arrangement of the pixels can be appropriately changed according to, for example, the number of pixels constituting one pixel block.

Further, in the above-described embodiment, the polarization filter element and the spectral filter element are disposed between the photodiode and the microlens. However, one or both of the polarization filter element and the spectral filter element may be disposed in front of the microlens (on the object side). In addition, the disposition of the polarization filter element and the spectral filter element between the microlens and the photodiode makes it possible to effectively prevent light from being mixed into adjacent pixels. Therefore, it is possible to further prevent crosstalk.

[Configuration of Signal Processing Unit]

The function of the image generation unit 200B (arithmetic unit) in the signal processing unit 200 can be implemented by using various processors. The various processors include, for example, a central processing unit (CPU) which is a general-purpose processor that executes software (program) to implement various functions. In addition, the various processors include, for example, a graphics processing unit (GPU) which is a processor specialized in image processing and a programmable logic device (PLD), such as a field programmable gate array (FPGA), which is a processor whose circuit configuration can be changed after manufacture. Further, the various processors include, for example, a dedicated electric circuit, such as an application specific integrated circuit (ASIC), which is a processor having a dedicated circuit configuration designed to perform a specific process.

The functions of each unit may be implemented by one processor or a combination of a plurality of processors of the same type or different types (for example, a combination of a plurality of FPGAs, a combination of a CPU and an FPGA, or a combination of a CPU and a GPU). In addition, a plurality of functions may be implemented by one processor. A first example of the configuration in which a plurality of functions are implemented by one processor is an aspect in which one processor is configured by a combination of one or more CPUs and software and implements a plurality of functions. A representative example of this aspect is a server computer. A second example of the configuration is an aspect in which a processor that implements the functions of the entire system using one integrated circuit (IC) chip is used. A representative example of this aspect is a system on chip (SoC). As such, various functions are implemented by using one or more of the various processors as the hardware structure. In addition, specifically, an electric circuit (circuitry) obtained by combining circuit elements, such as semiconductor elements, is used as the hardware structure of the various processors. These electric circuits may be electric circuits that implements the above-mentioned functions using OR, AND, NOT, exclusive OR, and logical operations obtained by combining them.

In a case in which the above-mentioned processor or electric circuit executes software (program), a processor (computer) readable code of the software to be executed is stored in a non-temporary recording medium, such as a read only memory (ROM), and the processor refers to the software. The software stored in the non-temporary recording medium includes a program for performing, for example, image input, image analysis, and display control. The code may be recorded on non-temporary recording media, such as various magneto-optical recording devices and semiconductor memories, instead of the ROM. In the case of processes using software, for example, a random access memory (RAM) may be used as a temporary storage area. In addition, for example, data stored in an electronically erasable and programmable read only memory (EEPROM) (not illustrated) may be referred to.

The coefficient storage unit 200C of the signal processing unit 200 can be implemented by, for example, a memory such as a read only memory (ROM) or an electronically erasable and programmable read only memory (EEPROM).

[Configuration of Imaging Device]

The imaging device may be configured as an interchangeable lens imaging device in which an optical system is interchangeable. In this case, the matrix A is uniquely determined for each lens (optical system). Therefore, the matrix A is prepared for each lens, and the coefficient group of the matrix is stored in the coefficient storage unit. In a case in which the lens is interchanged, the coefficient group of the matrix A corresponding to the interchanged lens is read out from the coefficient storage unit, and arithmetic processing is performed to generate the image of each optical region.

EXPLANATION OF REFERENCES

1: imaging device
10: optical system
12: lens
14: pupil division filter
16: spectral filter
18: polarization filter
100: image sensor
110: pixel array layer
112: photodiode
120: polarization filter element array layer
122A: first polarization filter element
122B: second polarization filter element
122C: third polarization filter element
130: spectral filter element array layer
132A: first spectral filter element
132B: second spectral filter element
132C: third spectral filter element
140: microlens array layer
142: microlens
200: signal processing unit
200A: analog signal processing unit
200B: image generation unit
200C: coefficient storage unit
CI1: image generated by pixel signal x1 from first pixel P1
CI2: image generated by pixel signal x2 from second pixel P2
CI1: image generated by pixel signal x3 from third pixel P3
CI4: image generated by pixel signal x4 from fourth pixel P4
CI5: image generated by pixel signal x5 from fifth pixel P5
CI6: image generated by pixel signal x6 from sixth pixel P6
CI7: image generated by pixel signal x7 from seventh pixel P7
CI8: image generated by pixel signal x8 from eighth pixel P8
CI9: image generated by pixel signal x9 from ninth pixel P9
D1: first image data generated by extracting pixel signal of first pixel P1 from pixel block
D2: second image data generated by extracting pixel signal of second pixel P2 from pixel block
D3: third image data generated by extracting pixel signal of second pixel P3 from pixel block
D4: fourth image data generated by extracting pixel signal of fourth pixel P4 from pixel block
D5: fifth image data generated by extracting pixel signal of fifth pixel P5 from pixel block
D6: sixth image data generated by extracting pixel signal of sixth pixel P6 from pixel block
D7: seventh image data generated by extracting pixel signal of seventh pixel P7 from pixel block
D8: eighth image data generated by extracting pixel signal of eighth pixel P8 from pixel block
D9: ninth image data generated by extracting pixel signal of ninth pixel P9 from pixel block
F1: first spectral filter unit of spectral filter
F2: second spectral filter unit of spectral filter
F3: third spectral filter unit of spectral filter
F4: fourth spectral filter unit of spectral filter
F5: fifth spectral filter unit of spectral filter
F6: sixth spectral filter unit of spectral filter
F7: seventh spectral filter unit of spectral filter
F8: eighth spectral filter unit of spectral filter
F9: ninth spectral filter unit of spectral filter
G1: first spectral filter unit
G2: second spectral filter unit
G3: third spectral filter unit
ID1: image of first optical region of optical system
ID2: image of second optical region of optical system
ID3: image of third optical region of optical system
ID4: image of fourth optical region of optical system
ID5: image of fifth optical region of optical system
ID6: image of sixth optical region of optical system
ID7: image of seventh optical region of optical system
ID8: image of eighth optical region of optical system
ID9: image of ninth optical region of optical system
L: optical axis
OI1: first optical image of object obtained by first optical region of optical system
OI2: second optical image of object obtained by second optical region of optical system
OI3: third optical image of object obtained by third optical region of optical system
OI4: fourth optical image of object obtained by fourth optical region of optical system
OI5: fifth optical image of object obtained by fifth optical region of optical system OI6: sixth optical image of object obtained by sixth optical region of optical system
OI7: seventh optical image of object obtained by seventh optical region of optical system
OI8: eighth optical image of object obtained by eighth optical region of optical system
OI9: ninth optical image of object obtained by ninth optical region of optical system
Obj: object
P1: first pixel
P2: second pixel
P3: third pixel
P4: fourth pixel
P5: fifth pixel
P6: sixth pixel
P7: seventh pixel
P8: eighth pixel
P9: ninth pixel
Pi: i-th pixel
PB(x, y): pixel block
S1: first optical region of optical system
S2: second optical region of optical system
S3: third optical region of optical system
S4: fourth optical region of optical system
S5: fifth optical region of optical system
S6: sixth optical region of optical system
S7: seventh optical region of optical system
S8: eighth optical region of optical system
S9: ninth optical region of optical system
Sj: j-th optical region of optical system
T1: graph of spectral transmittance of first spectral filter element
T2: graph of spectral transmittance of second spectral filter element
T3: graph of spectral transmittance of third spectral filter element
X1: pixel signal corresponding to first optical region of optical system
X2: pixel signal corresponding to second optical region of optical system
X3: pixel signal corresponding to third optical region of optical system
X4: pixel signal corresponding to fourth optical region of optical system
X5: pixel signal corresponding to fifth optical region of optical system
X6: pixel signal corresponding to sixth optical region of optical system
X7: pixel signal corresponding to seventh optical region of optical system
X8: pixel signal corresponding to eighth optical region of optical system
X9: pixel signal corresponding to ninth optical region of optical system
Xj: pixel signal corresponding to j-th optical region of optical system
x1: pixel signal of first pixel
x2: pixel signal of second pixel
x3: pixel signal of third pixel
x4: pixel signal of fourth pixel
x5: pixel signal of fifth pixel
x6: pixel signal of sixth pixel
x7: pixel signal of seventh pixel
x8: pixel signal of eighth pixel
x9: pixel signal of ninth pixel
xi: pixel signal of i-th pixel $\Delta f1$: wavelength band of light transmitted by first spectral filter unit (first wavelength band)
$\Delta f2$: wavelength band of light transmitted by second spectral filter unit (second wavelength band)
$\Delta f3$: wavelength band of light transmitted by third spectral filter unit (third wavelength band)
$\Delta f4$: wavelength band of light transmitted by fourth spectral filter unit (fourth wavelength band)
$\Delta f5$: wavelength band of light transmitted by fifth spectral filter unit (fifth wavelength band)
$\Delta f6$: wavelength band of light transmitted by sixth spectral filter unit (sixth wavelength band)
$\Delta f7$: wavelength band of light transmitted by seventh spectral filter unit (seventh wavelength band)
$\Delta f8$: wavelength band of light transmitted by eighth spectral filter unit (eighth wavelength band)
$\Delta f9$: wavelength band of light transmitted by ninth spectral filter unit (ninth wavelength band)
$\alpha 1$: polarization direction of light transmitted by first polarization filter unit (transmission polarization direction, azimuth angle)
$\alpha 2$: polarization direction of light transmitted by second polarization filter unit (transmission polarization direction, azimuth angle)
$\alpha 3$: polarization direction of light transmitted by third polarization filter unit (transmission polarization direction, azimuth angle)
$\beta 1$: polarization direction of light transmitted by first polarization filter element (transmission polarization direction, azimuth angle)
$\beta 2$: polarization direction of light transmitted by second polarization filter element (transmission polarization direction, azimuth angle)
$\beta$: polarization direction of light transmitted by third polarization filter element (transmission polarization direction, azimuth angle)
$\lambda 1$: center wavelength of transmission wavelength band of first spectral filter unit
$\lambda 2$: center wavelength of transmission wavelength band of second spectral filter unit
$\lambda 3$: center wavelength of transmission wavelength band of third spectral filter unit
$\lambda 4$: center wavelength of transmission wavelength band of fourth spectral filter unit
$\lambda 5$: center wavelength of transmission wavelength band of fifth spectral filter unit
$\lambda 6$: center wavelength of transmission wavelength band of sixth spectral filter unit
$\lambda 7$: center wavelength of transmission wavelength band of seventh spectral filter unit
$\lambda 8$: center wavelength of transmission wavelength band of eighth spectral filter unit
$\lambda 9$: center wavelength of transmission wavelength band of ninth spectral filter unit

What is claimed is:
1. An imaging device comprising:
an image sensor including a plurality of pixel blocks, each of which includes n types of first optical filter elements having different spectral transmittances and m types of second optical filter elements having different transmission polarization directions which are combined such that q types of light are received by each pixel, where n is an integer satisfying $n \geq 2$, m is an integer satisfying $2 \leq m \leq 3$, and q is a product of n and m;
an optical system that includes k optical regions transmitting light in different wavelength bands and polar- ization filter units provided in each of the optical regions, where k is an integer satisfying k≤q;

a storage unit that stores a coefficient group configured by a matrix A of k rows and q columns in which each element is represented by aij, where i is an integer satisfying 1≤i≤k and j is an integer satisfying 1≤j≤q; and an arithmetic unit that acquires the coefficient group from the storage unit and calculates k pixel signals X1, X2, ..., Xk corresponding to each of the optical regions of the optical system from q pixel signals x1, x2, ..., Xq obtained from each of the pixel blocks of the image sensor using the following expression $$\begin{bmatrix} X1 \\ X2 \\ \vdots \\ Xk \end{bmatrix} = \begin{bmatrix} a11 & a12 & \cdots & a1q \\ a21 & a22 & \cdots & a2q \\ \vdots & \vdots & \vdots & \vdots \\ ak1 & ak2 & \cdots & akq \end{bmatrix} * \begin{bmatrix} x1 \\ x2 \\ \vdots \\ xq \end{bmatrix}.$$

2. The imaging device according to claim 1, wherein the matrix A is acquired by calculating an inverse matrix of a matrix that has, as an element, a ratio at which light incident on each of the optical regions of the optical system is received by each of the pixels of each of the pixel blocks of the image sensor.

3. The imaging device according to claim 2, wherein, in a case in which a transmittance based on polarization is c and a transmittance based on spectral transmittance is d, the ratio at which the light incident on each of the optical regions of the optical system is received by each of the pixels of each of the pixel blocks of the image sensor is calculated by a product of c and d.

4. The imaging device according to claim 3, wherein the transmittance c based on polarization is obtained by calculating a square of a cosine of an angular difference between the transmission polarization direction of the light transmitted through the optical region and the transmission polarization direction of the light received by the pixel, and the transmittance d based on spectral transmittance is calculated on the basis of the wavelength band of the light transmitted through the optical region and the spectral transmittance of the first optical filter element included in the pixel.

5. The imaging device according to claim 1, wherein, in the optical system, the number of the polarization filter units having the same transmission polarization direction is equal to or less than n.

6. The imaging device according to claim 1, wherein each of the pixel blocks of the image sensor has a configuration in which three types of the first optical filter elements having different spectral transmittances and three types of the second optical filter elements having different transmission polarization directions are combined such that nine types of light are received by each of the pixels.

7. The imaging device according to claim 6, wherein the optical system includes nine optical regions that transmit light in different wavelength bands.

8. The imaging device according to claim 7, wherein, in the optical system, each set of three optical regions includes the polarization filter unit having the same transmission polarization direction.

9. The imaging device according to claim 8, wherein a combination of the transmission polarization directions of the polarization filter units included in the optical system is the same as a combination of the transmission polarization directions of the second optical filter elements included in the image sensor.

10. The imaging device according to claim 1, wherein the optical system includes narrow-band filters having different transmission wavelengths which are provided in each of the optical regions.

11. The imaging device according to claim 10, wherein, in the optical system, the narrow-band filter is provided at a pupil position.

12. The imaging device according to claim 1, wherein, in the image sensor, the first optical filter element and the second optical filter element are provided between a photodiode and a microlens which constitute each of the pixels.

* * * * *